United States Patent [19]

Sakamoto et al.

[11] 4,296,443
[45] Oct. 20, 1981

[54] MAGNETIC HEAD TRACKING CONTROL SYSTEM

[75] Inventors: Hitoshi Sakamoto, Zama; Yoshiaki Wakisaka, Atsugi, both of Japan

[73] Assignee: Sony Corporation, Tokyo, Japan

[21] Appl. No.: 14,764

[22] Filed: Feb. 23, 1979

[30] Foreign Application Priority Data

Feb. 23, 1978 [JP] Japan ................................ 53-20332

[51] Int. Cl.³ .............................................. H04N 5/78
[52] U.S. Cl. ...................................... 360/10; 360/36; 360/77; 360/78
[58] Field of Search ...................... 360/10, 11, 36, 77, 360/75, 70, 73, 78; 358/8

[56] References Cited

U.S. PATENT DOCUMENTS

| | | | |
|---|---|---|---|
| 3,787,616 | 1/1974 | Falk et al. | 360/36 |
| 3,845,500 | 10/1974 | Hart | 360/77 |
| 3,959,815 | 5/1976 | Rotter et al. | 360/36 |
| 3,964,094 | 6/1976 | Hart | 360/77 |
| 4,014,040 | 3/1977 | Kornhaas | 360/77 X |
| 4,044,388 | 8/1977 | Metzger | 360/77 X |
| 4,106,065 | 8/1978 | Ravizza | 360/77 X |
| 4,120,008 | 10/1978 | Metzger et al. | 360/77 X |
| 4,141,047 | 2/1979 | Kambara et al. | 360/77 |
| 4,148,082 | 4/1979 | Okada et al. | 360/77 |
| 4,151,569 | 4/1979 | Hathaway | 360/77 |
| 4,151,570 | 4/1979 | Ravizza et al. | 360/77 |
| 4,163,993 | 8/1979 | Ravizza | 360/10 |
| 4,163,994 | 8/1979 | Sakamoto et al. | 360/77 X |
| 4,172,265 | 10/1979 | Sakamoto et al. | 360/77 X |
| 4,183,067 | 1/1980 | Kihara et al. | 360/75 |
| 4,184,181 | 1/1980 | Mijatovic | 360/77 |

FOREIGN PATENT DOCUMENTS 2722977 11/1978 Fed. Rep. of Germany ........ 360/77

Primary Examiner—John H. Wolff
Assistant Examiner—Donald McElheny, Jr.
Attorney, Agent, or Firm—Lewis H. Eslinger; Alvin Sinderbrand

[57] ABSTRACT

In an apparatus for reproducing video or other information signals recorded in successive parallel tracks extending obliquely on a magnetic tape or other record medium which is adapted to be longitudinally advanced, and with each of the tracks containing a positional signal, for example, constituted by a vertical synchronizing signal, at a predetermined position along the respective track, a magnetic head or transducer is movable in the direction generally along the tracks for reproducing the information and positional signals recorded therein and is mounted or supported by a bimorph leaf or other transducer deflecting device which is operative, in response to the reception of an electrical drive signal, for deflecting the transducer or head in a direction transverse to the direction along the tracks, a circuit detects a time base error of the positional signal reproduced from each of the tracks, and a control circuit for providing the electrical drive signal to the transducer deflecting device is effective to vary such drive signal in accordance with the detected time base error. A time base variation of the reproduced signals is further detected, for example, in respect to the successive horizontal synchronizing signals of the reproduced video signals, and the electrical drive signal for the transducer deflecting device is also varied in accordance with such detected time base variation.

62 Claims, 29 Drawing Figures

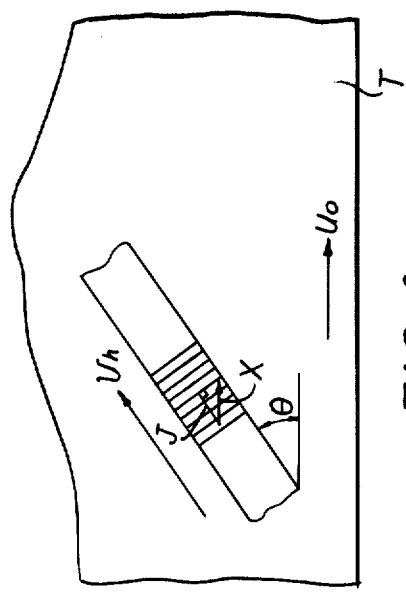
FIG. 4
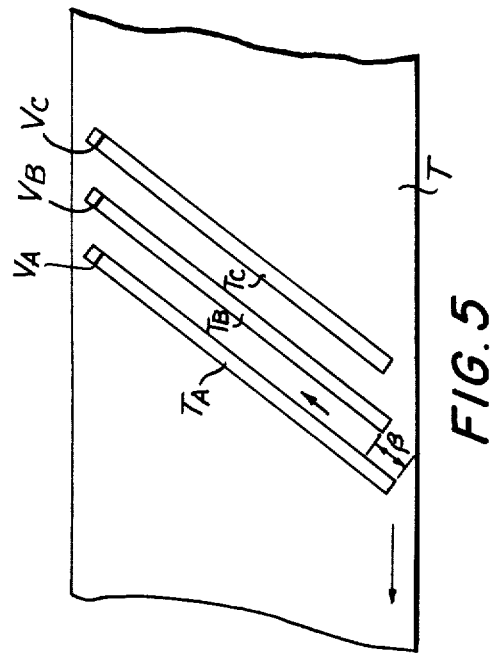
FIG. 5
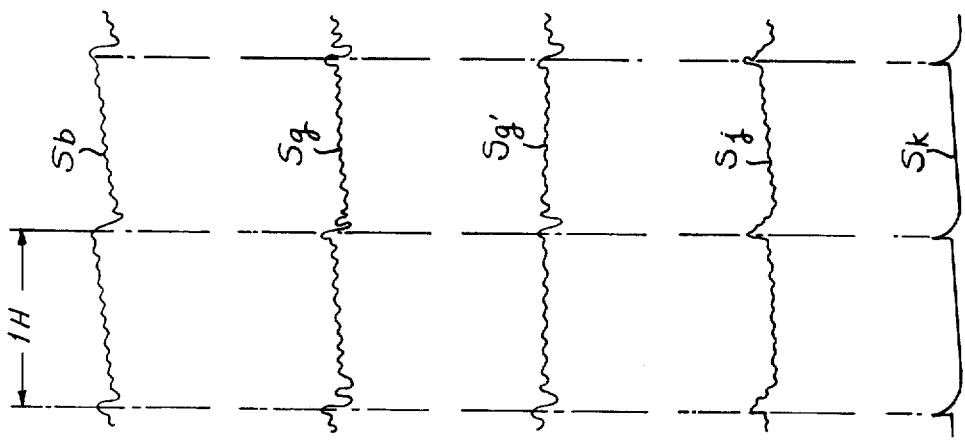
FIG. 3A
FIG. 3B
FIG. 3C
FIG. 3D
FIG. 3E

MAGNETIC HEAD TRACKING CONTROL SYSTEM

BACKGROUND OF THE INVENTION

1. Field of the Invention

This invention relates generally to apparatus, such as, a video tape recorder (VTR) of the so-called "helical-scan type", in which video or other information signals are recorded in successive parallel tracks which are skewed or extend obliquely on a magnetic tape, and more particularly is directed to an improved system by which a magnetic head or other transducer in such apparatus is made to accurately scan the track or tracks in which the video or other information signals are recorded.

2. Description of the Prior Art

In a conventional helical-scan VTR, the magnetic tape extends helically about at least a portion of the periphery of a guide drum and is adapted to be moved or advanced in the longitudinal direction of the tape while at least a portion of the guide drum is rotated, and the transducer or magnetic head is mounted on a rotated portion of the guide drum so as to rotate with the latter and thereby repeatedly scan across the tape in a path at an angle to the longitudinal direction of the tape. During recording operation of the VTR, the angle between the scanning path, and hence each record track, and the longitudinal direction of the tape is dependent on the rotational speed of the rotary head and also the speed at which the magnetic tape is longitudinally advanced. Accordingly, if the rotational speed of the rotary head and/or the speed and direction of advancement of the magnetic tape are not the same during the reproducing operation as during the recording operation, then the scanning path of the magnetic head during reproducing will not precisely follow or coincide with a record track on the tape during each movement of the head across the tape and, accordingly, the recorded video or other information signals may not be correctly or accurately reproduced. For example, if the magnetic tape is at rest during a reproducing operation, as in the still-motion mode of operation, the angle of the scanning path of the rotary magnetic head relative to the longitudinal direction of the tape may be sufficiently different from the angle at which the record tracks are skewed that the magnetic head scans portions of two adjacent record tracks during initial and concluding portions of its scanning movement across the tape. Even when the speed of advancement of the tape is the same during the reproducing and recording operations, the magnetic head may not correctly scan each of the successive record tracks as a result of stretching or other deformation of the tape following the recording operation.

Various arrangements have been proposed for maintaining correct tracking or scanning of the record tracks by the rotary head. In the most desirable of these known arrangements, means are provided for deflecting the head in a direction normal to the plane of its rotation, that is, in a direction which is transverse in respect to the direction along each of the record tracks, and the amount of such deflection is electrically controlled during the movement of the head along each track so as to achieve accurate scanning of the latter. In published Japanese Patent Application No. 9919/1974 (Applicant: Matsushita Electric Industrial Company, Limited), it is generally disclosed to control the amount of deflection of the head in the direction normal to its plane of rotation in dependence on the difference between the speeds of advancement of the tape during the recording and reproducing operations so as to theoretically make possible the correct reproduction of the recorded video signals in the still-motion mode in which the tape is at rest, in the slow-motion mode in which the speed of advancement of the tape is, for example, $\frac{1}{4}$ or $\frac{1}{2}$ the tape speed for the recording operation, and in the quick-motion mode in which the speed of advancement of the tape is substantially greater than, for example, 2 times the tape speed, for the recording operation. Further, in Published Japanese Patent Application No. 117,106/1977 (Applicant: Ampex Corporation), it is disclosed to detect the amount of deflection of the head required for accurately scanning a record track thereby. When the detected deflection approaches the physical limit of that possible with the bi-morph leaf or other transducer deflecting means supporting the head, the electrical drive signal for the bi-morph leaf is controlled to cause the head to scan the next adjacent record track, that is, to effect a so-called "track jump". By reason of such "track jump" it is theoretically possible to effect correct slow-motion reproduction and also reverse-motion reproduction in which, for example, the tape is advanced longitudinally at the same speed as for the recording operation, but in the reverse or opposite direction.

However, in the non-normal reproduction modes, for example, the still-motion, slow-motion and reverse-motion modes, troubles arise by reason of time base variations of the reproduced signals. Such time base variations are caused mainly by the distance, measured in the direction along the record tracks, provided between the initial ends of the adjacent record tracks for achieving so-called H-alignment, and by the change occurring in the relative speed of the tape and magnetic head due to change-over of the speed of advancement of the tape. Time base variations are further caused by unavoidable fluctuations in the rotational speed of the magnetic head and in the speed of advancement of the tape during the reproducing operation. Of course, any fluctuations in the rotational speed of the magnetic head and the speed of advancement of the tape occurring during the recording operation are included in the recorded signals, and carried over into the reproduced signals to give rise to corresponding time base variations in the latter.

The above described time base variations can, for the most part, be corrected by means of existing time base correctors (TBC). However, the known time base correctors are generally not suitable for correcting time base errors of the magnitude encountered with track jumps by the magnetic head. For example, an excessive time base variation which cannot be corrected by existing time base correctors may be encountered in the case of a VTR with track-jumping capability when the speed of advancement of the tape is changed during the scanning of a particular record track or when the record track is severely deformed.

It has also been proposed, for example, as disclosed in Published Japanese Patent Application No. 84617/1974 (Applicant: Nippon Hoso Kyokai), to avoid mistracking due to deformation of the record track or the like by monitoring the position of the head relative to the record track during the scanning of the latter through reproduction of the recorded video or other information signals while a small oscillatory motion or dither of constant amplitude and period is imparted to the head via its supporting element or arm. The oscillation of the head introduces deviations in the envelope of the reproduced information signals obtained when more or less scanning the record track. Such deviations take the form of an amplitude modulation of the envelope of the reproduced signals, with the change in magnitude of the envelope being representative of the amount of traverse displacement of the head from the optimum position with respect to the track, and with the direction of traverse displacement of the head from the optimum transducing position being represented by the phase of the envelope amplitude modulation at the fundamental frequency of the oscillatory motion or dither. To obtain the head position information, the modulated RF envelope signal reproduced by the head is applied to an amplitude modulation envelope detector which recovers the dither signal fundamental and its sidebands, whereupon the output of the envelope detector is applied to a synchronous modulation detector which detects the amplitude and polarity of the output of the envelope detector with reference to the original or constant dither or oscillation signal by which the head is made to oscillate transversely. The synchronous amplitude modulation detector provides a tracking error signal which is added to the dither oscillation signal to provide the drive signal applied to the transducer deflecting means, such as, a bi-morph leaf, mounting the head for effecting the movements or deflections of the head in a direction transverse to the direction along each of the record tracks. Generally, the amplitude of the tracking error signal is proportional to the transverse distance from the null position of the oscillated head to the track center, while the polarity of the tracking error signal is indicative of the direction of such displacement of the null position from the track center. Therefore, the tracking error signal, when added to the dither or oscillation signal, tends to align the null position of the head with the center of the track. However, the frequency of vibration of the bi-morph leaf supporting the magnetic head is mechanically restricted to a certain range, whereby the response to the head to a tracking error is correspondingly restricted. When the VTR is capable of being operated in the so-called "jog" reproducing mode, or when the VTR is changed-over from its normal reproducing mode to a slow-motion reproducing mode, the speed of advancement of the tape is changed abruptly and correct tracking control of the magnetic head cannot be maintained by the previously described systems according to the prior art.

OBJECTS AND SUMMARY OF THE INVENTION

Accordingly, it is an object of this invention to provide an apparatus for reproducing information signals recorded in successive parallel tracks on a record medium with an improved tracking control system which avoids the above-described problems associated with the prior art.

More particularly, it is an object of this invention to provide a tracking control system, as aforesaid, by which information signals recorded in successive parallel tracks on a record medium can be correctly reproduced while reducing to a minimum any time base variations in the reproduced signals.

Another object is to provide a tracking control system, as aforesaid, which is capable of reducing to a minimum any time base variations in the reproduced signals even when the reproducing operation is effected in the still-motion, slow-motion or reverse-motion mode.

In accordance with an aspect of this invention, each of the successive parallel tracks on a record medium in which information signals are recorded further contains a positional signal, for example, a vertical synchronizing signal, at a predetermined position along the respective track, and the apparatus for reproducing the information signals comprises transducer means movable along each track for reproducing the information and positional signals recorded therein, transducer deflecting means mounting the transducer means and being operative in response to an electrical drive signal for deflecting the transducer means in a direction which is transverse in respect to the direction along each of the tracks, means for detecting a time base error of the positional signal reproduced from each track, and control circuit means for providing the electrical drive signal and including means for varying the latter in accordance with the detected time base error so as to control the deflection of the transducer means in the transverse direction at least in accordance with the detected time base error.

It is also a feature of this invention to provide the apparatus, as aforesaid, with means for detecting a time base variation of the reproduced signals, for example, in respect to horizontal synchronizing signals included therein, and varying the electrical drive signal in accordance with such detected time base variation.

Moreover, it is a feature of this invention to provide an apparatus, as aforesaid, in which a dither oscillation signal is included in the electrical drive signal for the transducer deflecting means so as to cause the transducer means to oscillate in the transverse direction about a null position, and to detect the envelope of the output of the transducer means as the latter moves along a track and oscillates in the transverse direction, whereupon the detected envelope is synchronously demodulated by means of a deflection signal which corresponds to the deflection of the transducer means in the transverse direction from a rest position, so as to obtain a traking error signal which is also included in the electrical drive signal for the transducer deflecting means.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIGS. 3A–3E are waveform diagrams illustrating signals obtained at various portions of the system shown on FIGS. 1 and 2, and to which reference will be made in explaining the operation of such system;

FIG. 4 is a diagrammatic view showing a fragment of a magnetic tape and to which reference will be made in explaining the manner in which time base variations may arise in signals reproduced from the magnetic tape;

FIG. 5 is a fragmentary, schematic plan view of a magnetic tape with a number of parallel record tracks extending obliquely thereon for showing the presence in such tracks of vertical synchronizing signals employed in accordance with this invention for detecting time base errors;

DESCRIPTION OF THE PREFERRED EMBODIMENTS

Figure 1:
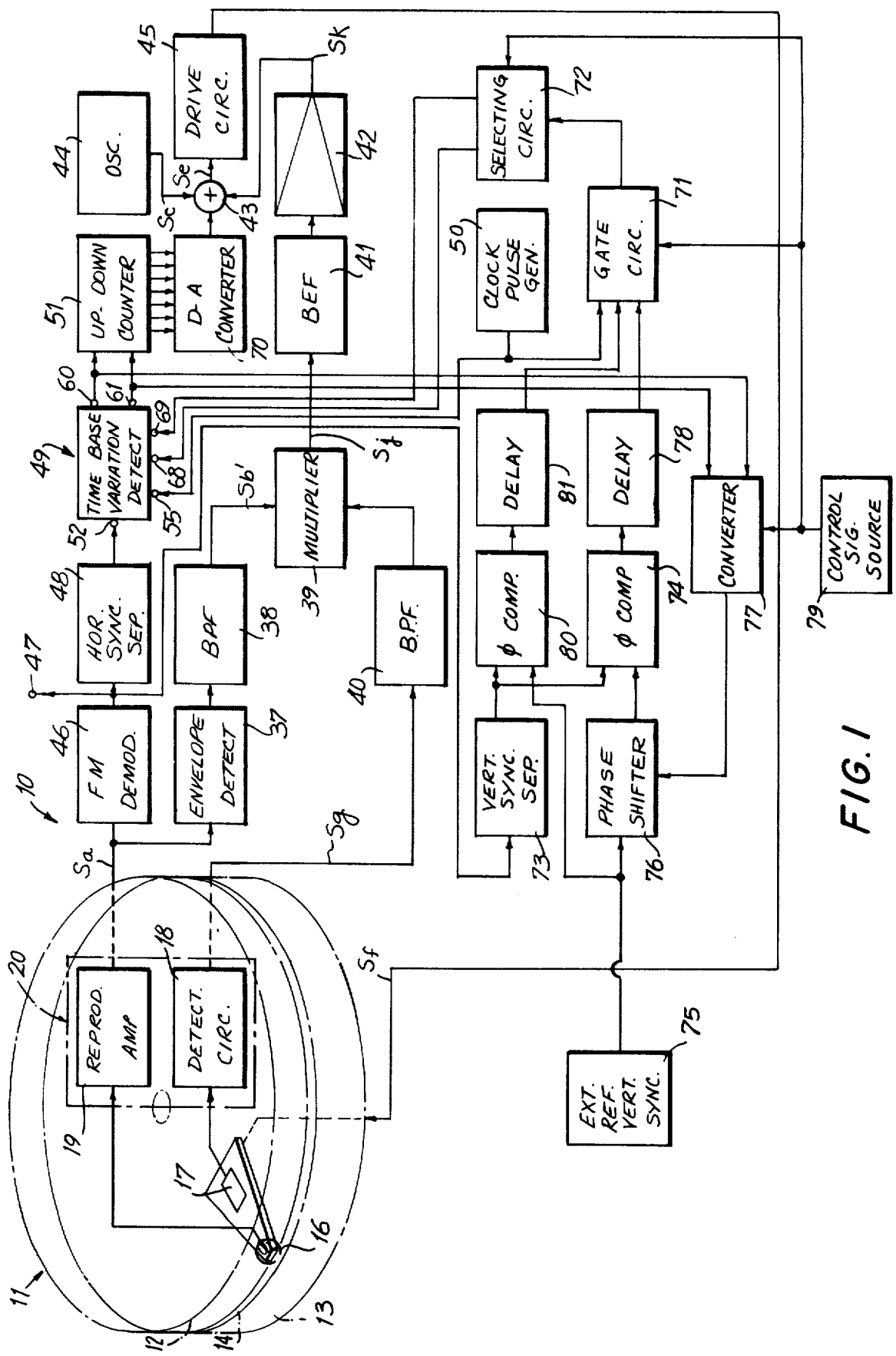
FIG. 1 is a block diagram of a tracking control system for a VTR in accordance with one embodiment of this invention.

Referring to FIG. 1 in detail, it will be seen that the present invention is there shown applied to a helical-scan VTR 10 having a guide drum assembly 11 comprised of a rotatable upper drum portion 12 and a stationary lower drum portion 13 which are spaced apart to define a circumferential slit 14 therebetween. A bi-morph leaf 15 of piezo-ceramic material is fixed, at its base or radially inner end, to the bottom surface of the rotatable upper drum portion 12, and a magnetic head 16, for example, in the form of a chip, is mounted at the free or outer end of bi-morph leaf 15 so as to extend through and be movable in circumferential slit 14. Bi-morph leaf 15 is adapted to deflect or flex in the vertical direction, that is, parallel to the axis of rotation of rotatable upper drum portion 12 in response to the application of an electrical drive signal $S_f$ to bi-morph leaf 15, as hereinafter described in detail. By reason of such vertical deflection or flexing of bi-morph leaf 15, magnetic head 16 is moved up and down in slit 14, that is, in the direction transverse to the direction of movement of head 16 along slit 14. A magnetic tape T (FIG. 5), which is not shown on FIG. 1, is guided in a helical path about a substantial portion, for example, about 360°, of the peripheries of upper and lower drum portions 12 and 13. Thus, upon rotation of upper drum portion 12, magnetic head 16 moves across the magnetic tape in a scanning path that extends obliquely in respect to the longitudinal direction of the tape. Further, in response to deflection or flexing of bi-morph 15, head 16 is moved in a direction normal or transverse to the scanning direction.

For the purpose of detecting the extent of the deflection of bi-morph leaf 15, a strain gauge 17 is attached to a surface of the bi-morph leaf. A circuit subassembly 20 is shown schematically on FIG. 1 to be rotatable with upper drum portion 12 and to generally comprise a detecting circuit 18 connected with strain gauge 17 for providing a deflection-detecting signal corresponding to the deflection of bi-morph 15, and a reproducing amplifier 19 connected with magnetic head 16 for amplifying signals reproduced from the tape.

Figure 2:
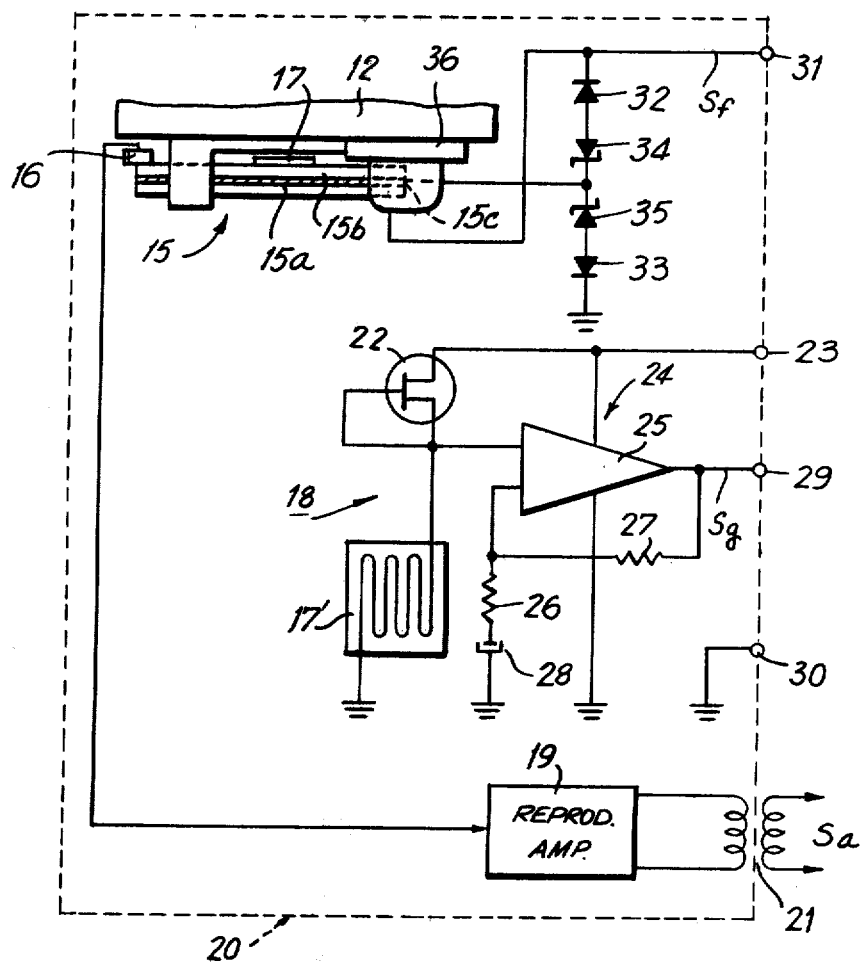
FIG. 2 is a schematic and circuit diagram showing details of a portion of the tracking control system of FIG. 1 which is rotatable with a rotary portion of a tape guide drum.

As shown on FIG. 2, the signals reproduced by head 16, after being amplified by reproducing amplifier 19, are transferred from rotary drum portion 12 as a reproduced signal $S_a$ by means of a rotary transformer 21. Further, on FIG. 2, strain gauge 17 is shown both in its actual position on bi-morph leaf 15 and in a position remote from the latter, as at 17', for ease in illustrating its connection to the associated deflection-detecting circuit 18. The strain gauge 17 may be of the resistance-wire type to which a constant current is supplied by way of a field-effect transistor 22 which is connected to a suitable voltage source (not shown) by way of a slip ring 23. It will be apparent that deflection of bi-morph leaf 15 causes a corresponding change in the resistance of strain gauge 17, and hence in the voltage across the strain gauge which represents the deflection-detecting signal. Such deflection-detecting signal or voltage is amplified by an amplifier 24 which includes an operational amplifier 25, resistors 26 and 27 and a capacitor 28. The output of operational amplifier 25 is supplied, as the deflection-detecting signal $S_g$, to a slip ring 29 for application through the latter to the remainder of the tracking system shown on FIG. 1. Another slip ring 30 may be provided, as shown on FIG. 2, for connection to ground, while still another slip ring 31 is provided for receiving an electrical drive signal $S_f$ for bi-morph leaf 15.

As shown particularly on FIG. 2, bi-morph leaf 15 is preferably formed of lower and upper piezo-ceramic elements 15a and 15b, respectively, having outer electrodes, and a central electrode 15c interposed between elements 15a and 15b. The electrical driving signal $S_f$ supplied through slip ring 31 is applied directly to the outer electrode of lower piezo-ceramic element 15a, and is further applied, through a voltage divider consisting of diodes 32 and 33 and zener diodes 34 and 35, to the central electrode 15c of bi-morph leaf 15. The outer electrode of upper piezo-ceramic element 15b is connected to ground, for example, through a supporting member 36 by which the radially inner end of bi-morph leaf 15 is secured to upper drum portion 12. It is also shown that magnetic head 16 and strain gauge 17 are secured on the upper surface of bi-morph leaf 15 which is connected to ground. Accordingly, the deflection-detecting signal $S_g$ which corresponds to the deflection of head 16 from its rest position is not superimposed on the drive signal $S_f$ for bi-morph leaf 15. Further, with the illustrated circuit for applying drive signal $S_f$ to bi-morph leaf 15, the piezo-ceramic elements 15a and 15b may be polarized in opposed directions, and the diodes 32 and 33 and zener diodes 34 and 35 ensure that drive signal $S_f$ will not cause depolarizing of the piezo-ceramic elements.

The reproduced RF signal $S_a$ obtained through rotary transformer 21 from reproducing amplifier 19, and which is frequency-modulated, is supplied to an envelope detecting circuit 37 (FIG. 1). As hereinafter described in detail, the signal $S_a$ is amplitude-modulated with a dither or oscillation signal S having a fixed frequency $F_c$ which may be about 450 Hz. The amplitude variations of the output or envelope signal $S_b$ (FIG. 3A) from envelope detecting circuit 37 represent, among other things, tracking errors which exist between the path of movement of head 16 and the record track being scanned by the head. However, the envelope signal $S_b$ also includes unwanted frequency components besides the tracking error information at the dither or oscillation signal frequency $f_c$, such as, for example, frequency components at the primary and secondary resonant frequencies and at the anti-resonant frequency of bi-morph leaf 15 and various other frequency components due to transient responses. Such unwanted frequency components adversely affect detection of, and correction for the tracking error between the scanning path of head 16 and the record track on the magnetic tape.

The envelope signal $S_b$ from envelope detector 37 is applied to a band pass filter 38 which is adapted to pass a frequency band centered at the dither or oscillation frequency $f_c$ and which contains the tracking error information. More particularly, the upper cut-off frequency of band pass filter 38 is selected to be somewhat lower than the frequency $2f_c$, while the frequency $f_c$ is several times greater than the selected lower cut-off frequency of filter 38. The resulting output signal $S_b'$ from band pass filter is applied to one input of a multiplier 39 which may be constituted by a balanced modulator. The deflection-detecting signal $S_g$ (FIG. 3B) obtained through slip ring 29 from detecting circuit 18 (FIG. 2) is supplied to another band pass filter 40 (FIG. 1) which has substantially the same characteristic as described above for band pass filter 38 so that filter 40 is adapted to pass a band of frequencies centered at the dither or oscillating frequency $f_c$. The deflection signal $S_g$ which corresponds to the instantaneous deflection of head 16 from its rest position may have the frequency component $f_c$ corresponding to the oscillation of bi-morph leaf 15 superimposed on a signal of triangular waveform. As hereinafter described, such signal of triangular waveform may be additionally applied to bi-morph 15 if, in the absence of such signal of triangular waveform, as during still-motion or slow-motion reproduction of recorded video signals, the path of movement or scanning path of head chip 16 would be at an angle in respect to the direction of each record track being scanned by the head.

In any event, filter 40 is effective to remove from the deflection-indicating signal $S_g'$ (FIG. 3C) obtained at its output the low-frequency component of any such triangular waveform. However, signal $S_g'$ still contains the unwanted frequency components, such as, components at the first and second order resonant and anti-resonant frequencies of bi-morph leaf 15 and various other frequency components due to the transient response in addition to the component at the dither or oscillation frequency $f_c$. Since the deflection-indicating or detecting signal $S_g$ or $S_g'$ represents the deflection of head 16 from its rest position, rather than the position of the head relative to the center of the track being scanned, it will be apparent that signal $S_g'$, when applied to another input of multiplier or balanced modulator 39, does not include any information in respect to the tracking error. Further, it will be appreciated that the frequency, phase and amplitude of the unwanted frequency components contained in deflection-indicating signal $S_g'$ substantially correspond to the frequency, phase and amplitude, respectively, of the corresponding unwanted frequency components contained in the envelope signal $S_b'$ obtained from filter 38. By reason of the foregoing, multiplier or balanced modulator 39 provides an output signal $S_j$ (FIG. 3D) which represents the difference or sum of the frequencies of the signals applied to the two inputs of multiplier 39. Thus, multiplier 39 is effective to eliminate from its output $S_j$ the components with the dither or oscillation frequency $f_c$ and with the unwanted frequencies, such as, the first and second order resonant and anti-resonant frequencies of bi-morph leaf 15. The resulting output signal $S_j$ contains the information in respect to the tracking errors and also a frequency component having the frequency $2f_c$ generated by the multiplier 39 and which is eliminated in a band eliminating filter 41. The filter 41 may be effective to block the passage therethrough of frequency components in a band centered at the frequency $2f_c$ and extending above and below the latter frequency by only a fraction of the frequency $f_c$. As a result of the foregoing, the output of band eliminating filter 41, after being amplified by an amplifier 42, provides a tracking error signal $S_k$ (FIG. 3E) which represents the deviation of head 16 from the center line of a record track being scanned thereby. It will be appreciated that the band eliminating filter 41 may be replaced by a low pass filter having a suitable characteristic to block the passage of the $2f_c$ frequency component.

The tracking error signal $S_k$ is applied from amplifier 42 to an adding circuit 43 in which it is added to the dither or oscillation signal $S_c$ obtained from an oscillator 44. The output or composite signal $S_e$ from adding circuit 43 is supplied to a drive circuit 45 which provides the corresponding electrical drive signal $S_f$ supplied through slip ring 31 (FIG. 2) to bi-morph leaf 15. Thus, bi-morph leaf 15 is driven so that the null position of head 16, when oscillated in the direction transverse to the direction along a record track, will correspond to the center of such track considered in the transverse direction.

It will be appreciated that, in the tracking system according to the embodiment of the invention shown on FIG. 1, the multiplier or balanced modulator 39 compares or synchronously demodulates the envelope signal $S_b'$ from envelope detector 37 by means of the deflection detecting or indicating signal $S_g'$ which represents the instantaneous position of head 16 and thus includes all of the unwanted frequency components also contained in the envelope signal. The foregoing is to be distinguished from those known systems, for example, as disclosed in the previously mentioned Published Japanese Patent Application No. 84617/1974, in which the multiplier or balanced modulator compares an envelope signal with the fixed dither or oscillating signal which does not include the unwanted frequency components, for example, arising from mechanical vibration of the bi-morph leaf. By reason of such distinction, the multiplier or balanced modulator 39 automatically eliminates the unwanted frequency components from the output signal $S_j$, with the result that signal $S_k$ accurately represents the tracking error and thereby permits more accurate corrections therefor.

It will be noted that the frequency $f_c$ of the dither or oscillation signal $S_c$ provided by oscillator 44 for effecting the dither of oscillation of head 16 is restricted by the resonance characteristics of bi-morph leaf 15, for example, to a frequency in the range between 400 Hz and 1 KHz. Accordingly, the tracking control system, to the extent described above, cannot cause the head 16 to follow rapid or sudden changes in the direction of the record track being scanned or sudden or abrupt changes in the tape speed.

When a tape being advanced at a tape speed $U_o$ has signals recorded in a skewed or oblique track thereon by means of a rotary recording head which is moving at the peripheral speed $V_h$, the jitter J (fluctuation of the time base) of the signals thereafter reproduced from the magnetic tape is represented by the following equation:

$$J = \frac{-x \cdot \cos\theta}{V_h - U_o \cdot \cos\theta} \text{ (sec.)} \quad (1)$$

in which x represents the deflection of the center of the recording head from the center or medial line of the record track measured in the direction of the length of the tape, and $\theta$ represents the angle between the path of movement of the reproducing head and the lengthwise direction of the magnetic tape when the latter is at rest. When variation of the jitter with time dt is represented by $\Delta J$, the rate of variation of the jitter is represented by the following equation:

$$\frac{\Delta J}{dt} = \frac{-\frac{\Delta x}{dt} \cdot \frac{1}{U_o} \cdot \cos\theta}{\frac{V_h}{U_o} - \cos\theta} \text{ (sec./sec.)} \quad (2)$$

In the above equations (1) and (2) the symbols $U_o$, $V_h$ and x are all considered to be positive when in the directions indicated by the arrows on FIG. 4.

It will be appreciated from equations (1) and (2) above that the time base of the reproduced signal is varied by deflection or movement of the head in the direction transverse in respect to the direction along the record track. Accordingly, in the apparatus according to this invention, the drive signal $S_f$ for deflecting bi-morph leaf 15 is further made to include a control signal for correcting a detected variation of the time base of the reproduced signal. By means of the foregoing, the magnetic head can be made to correctly trace or scan the record tracks in any of the reproducing modes of the VTR, such as, the still-motion reproducing mode, the slow-motion reproducing mode, the quick-motion reproducing mode and the reverse-motion mode in each of which the speed or direction of advancement of the tape is different from the speed or direction, respectively, of advancement of the tape during the recording of signals thereon.

In the slow-motion reproducing mode, the tape is advanced in the same direction as during recording, but at a speed that is 1/N times the normal tape speed for recording and reproducing (N being an integer), and each record track is scanned N-times. During the repeated scanning of a record track while the tape is being slowly advanced, the tracking control system causes progressively increasing deflection of bi-morph leaf 15. However, there is a limit to the possible deflection of bi-morph leaf 15 and, therefore, at certain intervals, the drive signal applied to the bi-morph leaf causes the magnetic head to cease scanning the record track from which signals have been repeatedly reproduced and to commence the scanning of a following record track, that is, to effect a so-called "track jump".

If, at the instant when magnetic head 16 is about to commence the scanning of track $T_B$ on FIG. 5, the voltage or drive signal applied to bi-morph leaf 15 is changed to move head 16 onto the next adjacent track $T_A$, it will be seen that head 16 will commence the scanning of track $T_A$ at the distance $\beta$ (FIG. 5) from the initial end of record track $T_A$. The distance $\beta$ is determined by the so-called "H-alignment" and is equal to 2.5H (H being one horizontal interval or period). Therefore, the time required for head 16 to move from an initial scanning position on track $T_A$, $T_B$ or $T_C$ to a predetermined position along the respective track, for example, to position $V_A$, $V_B$ or $V_C$ (FIG. 5) at which a respective vertical synchronizing signal is recorded, depends on the deflection of bi-morph leaf 15. In the previously-mentioned example, in which bi-morph leaf 15 is deflected so as to shift head 16 from track $T_B$ to track $T_A$, the vertical synchronizing signal is reproduced from position $V_A$ at a time that is earlier by 2.5H than the time for correct reproduction in which track $T_A$ is scanned from the beginning thereof. Therefore, whether or not a "track jump" is required can be determined from the phase of the vertical synchronizing signal or other positional signal recorded at a predetermined position along the record track being scanned. It will be appreciated that track jump is required in all of the reproducing modes of the VTR other than the still-motion reproducing mode and the normal reproducing mode. By combining the control of the track jump by means of the phase of the vertical synchronizing or other positional signal with the previously described deflection of bi-morph leaf 15 in response to time base variations, head 16 is made to correctly scan a record track regardless of any change in the direction or speed of movement of the tape and any deformation of the record track.

In order to effect such combined control in accordance with this invention, the apparatus illustrated by FIG. 1 is further shown to comprise an FM demodulator 46 receiving the reproduced RF signals $S_a$ from reproducing amplifier 19 and providing a demodulated reproduced video signal to an output terminal 47. The demodulated video signal is also applied to a synchronizing signal separator 48 by which the horizontal synchronizing signal is separated from the video signal and applied to a time base variation detector 49. The time base variation detector 49 further receives clock pulses from a clock pulse generator 50 and is operative to apply to an up-down counter 51 a pulse output comprised of a number of clock pulses corresponding to the extent to which the actual duration of a predetermined interval of the reproduced video signals, for example, measured by its horizontal synchronizing signals, varies in respect to the standard duration thereof. The interval measured with reference to the horizontal synchronizing signals may be the horizontal period between successive horizontal synchronizing signals or N.H (in which N is an integer). The case in which N is 2 will be described in connection with the time base variation detector 49 shown on FIG. 6.

Figure 6:
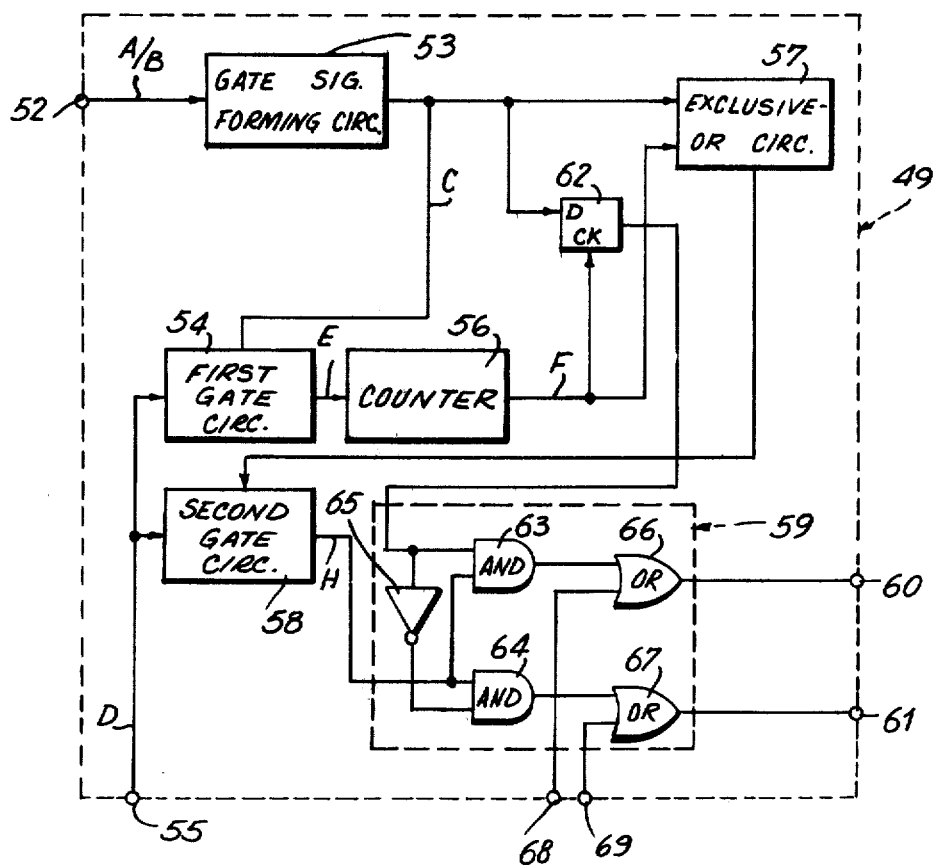
FIG. 6 is a block circuit diagram showing a time base variation detecting circuit included in the system of FIG. 1.

Although the time base variation detector may be simply a counter for counting the number of pulses from generator 50 during the interval 2H, in that case, an increased number of stages will have to be provided in the up-down counter 51 which is driven by the output pulses from time base variation detector 39. Accordingly, it is preferred that time base variation detector 49 be constituted by the circuit arrangement shown on FIG. 6 and in which an input terminal 52 receives the horizontal synchronizing signals separated from the reproduced video signals by separator 48. The separated horizontal synchronizing signals (FIG. 7A or 7B) are applied to a gate signal forming circuit 53 which provides a corresponding gating signal (FIG. 7C) to a first gate circuit 54 which also receives clock pulses (FIG. 7D) from generator 50 by way of an input terminal 55. Clock pulses passing through gate circuit 54 when the latter is opened are supplied to a counter 56 which counts the clock pulses up to a predetermined number corresponding to the normal or standard interval or period between successive horizontal synchronizing signals (FIG. 7A) and then generates a corresponding signal (FIG. 7F). The outputs of gate signal forming circuit 53 and counter 56 are applied to respective inputs of an exclusive-OR circuit 57 which provides a high-level output (FIG. 7G) when only one or the other, but not both, of the input signals thereto is at its respective high level. Such output of exclusive-OR circuit 57 constitutes a count period signal having a pulse width corresponding to the time base variation and is supplied, as a gating signal, to a second gate circuit 58 which also receives the clock pulses from input terminal 55. When the count period signal (FIG. 7G) from exclusive-OR circuit 57 is at the high level, the clock pulses are passed through second gate circuit 58 (FIG. 7H) to a transmission circuit 59 which selectively applies such clock pulses to one or the other of output terminals 60 and 61 to be counted down or up, respectively, by up-down counter 51 connected with such output terminals.

As will be appreciated from the following detailed description of operation of time base variation detector 49, the number of clock pulses supplied through second gate circuit 58 to transmission circuit 59 corresponds to the extent of a detected time base variation. In order to determine the direction of such detected time base variation, a D-type flip-flop 62 has an input terminal D receiving the gating signal from gate signal forming circuit 53 and a clock terminal CK connected to the output of counter 56. The output of flip-flop 62 is employed for controlling transmission circuit 59 which is shown to have first and second AND circuits 63 and 64 each having one input thereof connected to receive the output of second gate circuit 58 while the other input of AND circuit 63 directly receives the output of flip-flop 62 and the other input of AND circuit 64 is connected with the output of flip-flop 62 through an inverting circuit 65. The transmission circuit 59 also includes first and second OR circuits 66 and 67 through which the outputs of AND circuits 63 and 64, respectively, are connected with output terminals 60 and 61. The circuit 49 on FIG. 6 is further shown to have input terminals 68 and 69 connected through OR circuits 66 and 67, respectively, with output terminals 60 and 61 for the transmission of "head-jump" signals, as hereinafter described in detail.

The count or output of up-down counter 51 is converted to an analog value or voltage by means of a digital-to-analog converter 70 which has its output applied to adding circuit 43 for inclusion in the composite signal $S_e$ with the result that the drive signal $S_f$ from drive circuit 45 also causes deflection of bi-morph leaf 15 in the sense to correct for any time base variations.

Figure 7A:
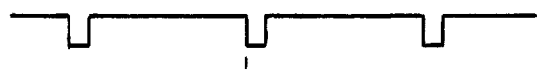
FIGS. 7A–7H are waveform diagrams illustrating signals obtained at various locations in the circuit of FIG. 6.
Figure 7B:
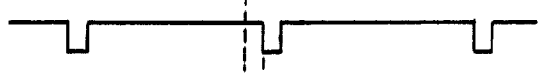
Figure 7C:
Figure 7D:
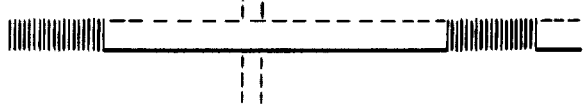
Figure 7E:
Figure 7F:
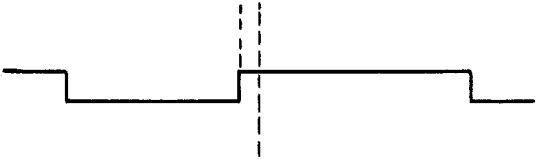
Figure 7G:
Figure 7H:

The operation of the time base variation detector 49 shown on FIG. 6 will now be described for the situation in which a time base variation of the reproduced video signals causes the intervals between the successive horizontal synchronizing signals separated therefrom (FIG. 7B) to be greater than the standard horizontal interval or period between successive horizontal synchronizing signals (FIG. 7A). Gate signal forming circuit 53 provides a rectangular gating signal (FIG. 7C) which is alternately negative and positive in successive horizontal intervals or periods of the reproduced video signals. So long as the gating signal from circuit 53 is negative, first gate circuit 54 is opened thereby to supply the clock pulses (FIG. 7D) from terminal 55 to counter 56. Counter 56 counts the clock pulses supplied thereto through gate circuit 54 up to a predetermined number of clock pulses (FIG. 7E) corresponding to the normal horizontal period indicated on FIG. 7A. The counter 56 provides a negative or low-level output (FIG. 7F) during the counting of the clock pulses and then generates a relatively high-level output. In the example illustrated by FIG. 7B, that is, when the interval or period between successive reproduced horizontal synchronizing signals is greater than the standard interval, the output of exclusive-OR circuit 57 (FIG. 7G) attains a high level for the period extending from the time when the output of counter 56 attains its high level (FIG. 7F) to the time when the gating signal from circuit 53 goes from the low level to the high level (FIG. 7C).

It will be appreciated that, if the interval between the successive reproduced horizontal synchronizing signals is equal to the standard horizontal interval or period, that is, there is no time base variation, then both the gating signal from circuit 53 (FIG. 7C) and the output of counter 56 (FIG. 7F) will change simultaneously from the low level to the high level, and there will be no high-level output or count period signal from circuit 57. On the other hand, if the time base variation is the opposite of that illustrated by FIG. 7B, that is, the interval between the successive reproduced horizontal synchronizing signals is less than the standard horizontal period, then the exclusive-OR circuit 57 will provide a high-level output or count period signal of a width corresponding to the time base variation and which occurs from the time when the gating signal from circuit 53 rises to its high level to the time when counter 56 completes its counting of the predetermined number of clock pulses (FIG. 7E) and changes its output from the low level to the high level (FIG. 7F).

In any case where there is a time base variation, the resulting count period signal (FIG. 7G) from exclusive-OR circuit 57 is applied to gate circuit 58 to open the latter for a corresponding period and allow the passage therethrough of a number of clock pulses (FIG. 7H) corresponding to the extent of the detected time base variation. If the time base variation increases the horizontal intervals or periods between successive reproduced horizontal synchronizing signals, as on FIG. 7B, in which case the output of counter 56 (FIG. 7F) attains the high level prior to the gating signal from circuit 73 (FIG. 7C), flip-flop 62 is conditioned thereby during the count period signal or pulse (FIG. 7G) from exclusive-OR circuit 57 to cause AND circuit 63 to transmit the resulting clock pulses (FIG. 7H) from gate circuit 58, while AND circuit 64 is blocked or closed. Conversely, when the time base variation causes the horizontal period or interval between successive reproduced horizontal synchronizing signals to be less than the standard horizontal period, flip-flop 62 is conditioned so that the clock pulses passing through gate circuit 58 (FIG. 7H) are transmitted further through AND circuit 64 while AND circuit 63 is closed or non-conductive. Those clock pulses passing through AND circuit 63 are further transmitted through OR circuit 66 to output terminal 60 and are counted down by counter 51 so as to correspondingly vary the voltage applied from digital-to-analog converter 70 to adding circuit 43. On the other hand, any clock pulses passing through AND circuit 64 are transmitted through OR circuit 67 to output terminal 61 so as to be counted up by counter 51 and thereby correspondingly vary the voltage applied by converter 70 to adding circuit 43. Accordingly, it will be appreciated that regardless of the direction in which the tape is being driven, the counting operation of up-down counter 51 is controlled only in accordance with the magnitude and direction of a detected time base variation.

Figure 8:
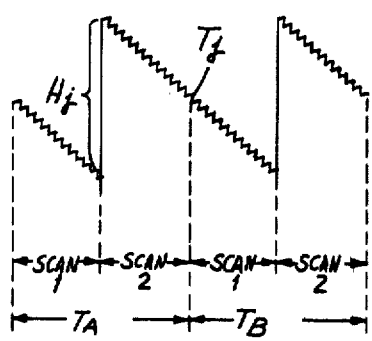
FIG. 8 is a waveform diagram illustrating an electrical drive voltage applied to a bi-morph leaf supporting a magnetic head in the VTR of FIG. 1 during a reproducing operation of such VTR in its one-half slow-motion mode.

Before continuing with the description of the components included in the tracking control system according to this invention as shown on FIG. 1, reference will be made to FIG. 8 as illustrative of the drive signal or voltage applied to bi-morph leaf 15 in the case of ½ slow-motion reproduction, that is, reproduction effected with the tape being driven in the same direction as used for recording but at ½ the recording tape speed. Although the drive voltage is shown to vary in a stepwise manner on FIG. 8 in consideration of the step-wise change in the output of counter 51, substantially linearly varying voltage is actually applied to bi-morph leaf 15 by reason of the capacitive character of the latter. In order to compensate for the fact that the tape speed during reproduction is less than the tape speed during recording, a progressively decreasing voltage is applied to bi-morph leaf 15 during each period in which head 16 scans the tape, and which normally corresponds with a vertical or field interval of the video signals. Further, in between successive scans of a particular record track, for example, between scan 1 and scan 2 of track $T_A$ on FIG. 8, the drive voltage applied to bi-morph leaf 15 is abruptly or rapidly changed, as indicated at $H_j$ so as to effect a so-called "head-jump". The voltage change $H_j$ for effecting the "head-jump" is generally equal to that voltage which, when applied to bi-morph leaf 15 for deflecting the latter, is effective to move head 16 from one record track to the next adjacent record track.

Referring again to FIG. 1, it will be seen that, for the purpose of obtaining the voltage $H_j$ to effect a "head-jump", the tracking control system according to this invention further comprises a third gate circuit 71 also connected to clock pulse generator 50 for receiving clock pulses from the latter, and a selecting circuit 72 which receives the clock pulses passing through gate circuit 71 when the latter is opened. As hereinafter described, circuit 72 selectively transmits clock pulses from gate circuit 71 either to terminal 68 or terminal 69 of time base variation detector 49 so as to be transmitted either through OR-circuit 66 or OR-circuit 67 to output terminal 60 or 61, respectively. Thus, clock pulses passing through gate circuit 71 are also counted down or up by counter 51 in dependence upon whether such clock pulses are directed by selecting circuit 72 to terminal 68 or terminal 69, respectively, of time base variation detector 49. In any case where gate circuit 71 is opened to effect a "head-jump", the number of clock pulses passing through circuit 71 corresponds to a voltage change in the voltage from converter 70 necessary for causing bi-morph leaf 15 to deflect head 16 from one record track to the next adjacent record track, from which it follows that the voltage change $H_j$ for effecting "head-jump" is equivalent to a change in phase of $\beta$ or 2.5H.

Since the deflection of bi-morph leaf 15 is limited to a certain maximum value, after head 16 scans a particular record track N-times, in the case of 1/N-slow-motion reproduction, a track jump is required to cause the head 16 to scan the next record track. In a conventional method, for example, as disclosed in the previously-identified Published Japanese Patent Application No. 117,106/1977, during slow-motion reproduction, the head jump is inhibited, that is, the voltage change at the end of a track scan is made zero, for achieving the automatic track jump, when it is detected that the bi-morph leaf has attained its non-deflected or "home position". However, in such conventional method, the track jump is always effected at a time when a very substantial time base error is encountered in the reproduced video signals so that accurate tracking control may not be possible.

As distinguished from the foregoing, in the illustrated embodiment of the present invention, the track jump is effected under conditions such that the time base error in the reproduced video signal is reduced to a minimum. For the foregoing purpose, the tracking control system of FIG. 1 is further shown to include a synchronizing signal separator 73 by which vertical synchronizing signals are separated from the reproduced video signals and applied to one input of a phase comparator 74 which, at its other input, receives external reference vertical synchronizing signals from a source 75 thereof after passage through a phase shifter 76. The external reference vertical synchronizing signals, shifted in phase by the phase shifter 76, and the reproduced vertical synchronizing signals are compared in phase by phase comparator 74 and, on the basis of such comparison, either a head jump or track jump is effected.

More particularly, the output terminals 60 and 61 of time base variation detector 49 are connected to a digital-to-analog converter 77 by which the number of pulses issuing from terminal 60 or 61 to indicate a respective detected time base variation is converted to a corresponding analog output for controlling phase shifter 76. Thus, the external reference vertical synchronizing signals from source 75 are shifted in phase shifter 76 by an amount corresponding to the analog output of converter 77, that is, an amount corresponding to the detected time base variation, prior to being applied to phase comparator 74. The output of phase comparator 74 is supplied through a delay circuit 78 to gate circuit 71. Since either the track jump or head jump is to be effected during a non-reproducing period, that is, when head 16 does not contact the tape, the time of the track jump or head jump has to be later than the time at which comparator 74 effects a phase comparison between the reproduced and external vertical synchronizing signals. Such lagging of the track jump or head jump relative to the phase comparison of the vertical synchronizing signals is achieved by delay circuit 78.

Figure 9A:
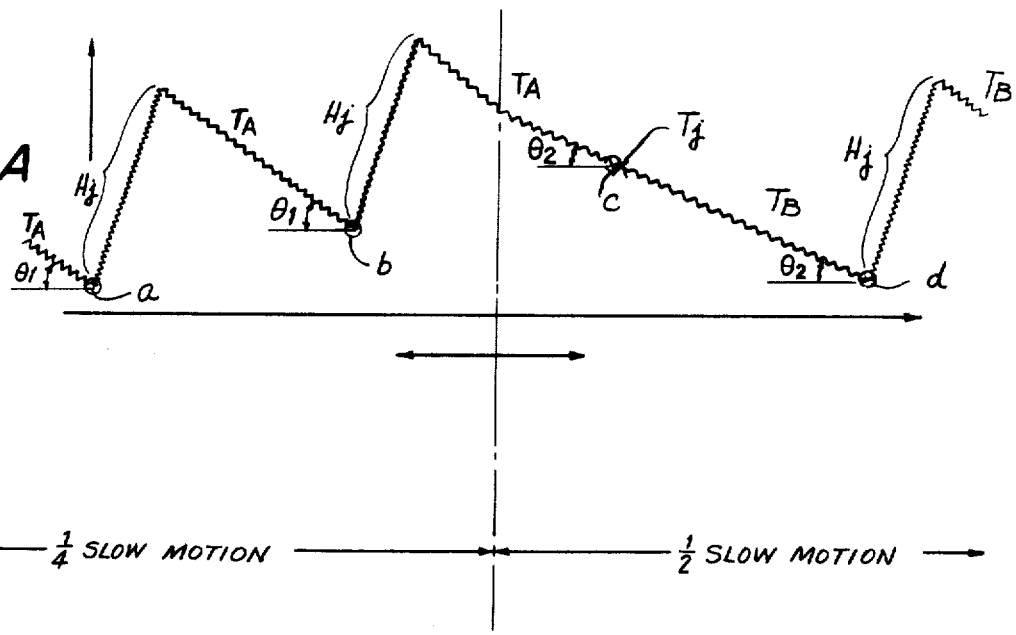
FIGS. 9A–9D are waveform diagrams to which reference will be made in explaining the operation of the tracking control system of FIG. 1 when, during a reproducing operation of the VTR, the latter is changed-over from its one-quarter slow-motion mode to its one-half slow-motion mode.

Operation of the above-described components for effecting a track jump or head jump will now be described with reference to FIGS. 9A–9D illustrating the case in which the VTR is changed-over from a ¼-slow-motion reproducing mode to the ½-slow-motion reproducing mode while signals are being reproduced from record track $T_A$ (FIG. 5) and, immediately thereafter, track jump of the head onto record track $T_B$ is effected. More particularly, FIG. 9A illustrates changes in the counting output of up-down counter 51 during repeated scanning of the tape, with the times immediately before the ends of successive scans of the record tracks being indicated at a, b, c and d.

Figure 9B:
Figure 9C:
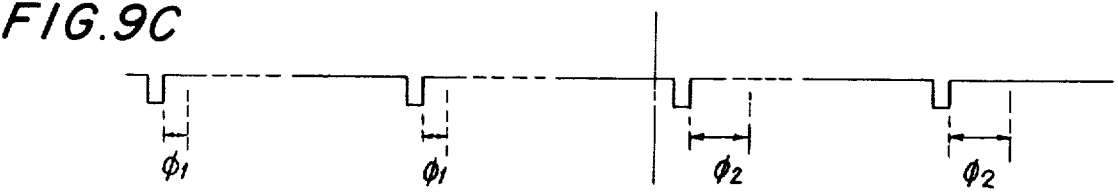
Figure 9D:

Since the tape speed at the times a and b is constant at ¼ the normal tape speed, the number of pulses applied to the digital-to-analog converter 77 from time base variation detecting circuit 49 in each horizontal period corresponds to the inclination $\theta_1$ of the variation of the counting output of counter 51 during scanning of record track $T_A$, and such inclinations at the times a and b, respectively, are substantially equal to each other. Accordingly, phase shifter 76 shifts the external reference vertical synchronizing signal (FIG. 9C) by a constant angle $\phi_1$ both at the times a and b to provide the shifted external reference vertical synchronizing signals (FIG. 9D) to be compared with the reproduced vertical synchronizing signals (FIG. 9B).

Each time a reproduced vertical synchronizing signal (FIG. 9B) lags behind the corresponding shifted external reference vertical synchronizing signal (FIG. 9D), as at the times a and b, the output of phase comparator 74 is supplied as a "head-jump" signal through delay circuit 78 to gate circuit 71. In response to such head-jump signal at each of the times a and b, gate circuit 71 supplies a predetermined number of the clock pulses from generator 50 through selecting circuit 72 to terminal 69 of time base variation detector 49, and thence through OR circuit 67 to terminal 61 so as to be counted in the up direction by counter 51. The number of clock pulses thus counted up by counter 51 at each of the times a and b is equivalent to the number required for the head-jump voltage change $H_j$ in the drive signal applied to bi-morph leaf 15.

Since the VTR is changed-over from the ¼-slow-motion reproducing mode to the ½-slow-motion reproducing mode between the times b and c, the counting output of counter 51 due to the time base variation detector 49 varies at an inclination or angle $\theta_2$ at the time c. The external reference vertical synchronizing signal (FIG. 9C) is correspondingly shifted by the phase $\phi_2$ by the application of the clock pulses from time base variation detector 49 through converter 77 to phase shifter 76, so that the shifted external reference vertical synchronizing signal (FIG. 9D) lags behind the reproduced vertical synchronizing signal (FIG. 9B). As a result of the foregoing, at the time c, the output of phase comparator 74 is at a low level and, when applied to gate circuit 71 through delay circuit 78, acts as a track-jump signal in gate circuit 71 so that the latter is not opened. Since gate circuit 71 is not opened at the time c, no clock pulses are transmitted therethrough to counter 51, and the latter continues to count down the clock pulses from time base variation detector 49. Thus, a track jump $T_j$ from track $T_A$ to track $T_B$ is effected at the time c and the head 16 thereafter scans record track $T_B$.

By the time d, that is, at the end of the first scan of record track $T_B$, the reproduced vertical synchronizing signal (FIG. 9B) again lags behind the shifted external vertical synchronizing signal (FIG. 9D) and, accordingly, the output of phase comparator 74 again attains a high level and is supplied through delay circuit 78 as a head-jump signal to gate circuit 71. Therefore, at the time d, gate circuit 71 is opened to pass the predetermined number of clock pulses through selecting circuit 72 to terminal 69 so as to be counted up by counter 51 for increasing by $H_j$ the voltage of the drive signal applied to bi-morph leaf 15.

Figure 10:
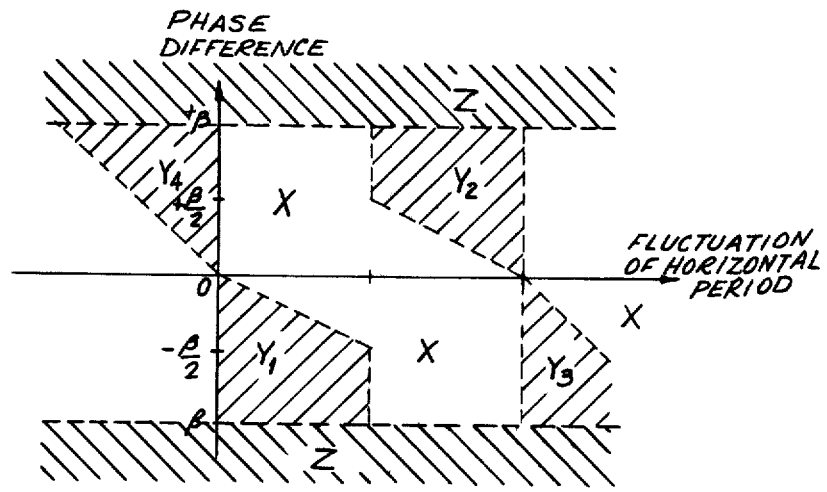
FIG. 10 is a graph illustrating operating parameters of a phase shifter included in the system of FIG. 1 when the positional signals employed for detecting time base errors are the vertical synchronizing signals, as on FIG. 5.

Generally speaking, phase comparator 74 provides a high level output for opening gate circuit 71 and thereby effecting a head jump when the reproduced vertical synchronizing signal lags behind the phase shifted external vertical synchronizing signal, whereas the output of phase comparator 74 is at a low level to close gate circuit 71 for inhibiting a head jump and thereby effecting a track jump when the shifted external vertical synchronizing signal lags behind the reproduced vertical synchronizing signal. Moreover, phase shifter 76 is controlled so that the amount of phase shift thereby imparted to the external reference vertical synchronizing signal in various reproducing modes of the VTR and for various phase differences between the reproduced and external reference vertical synchronizing signals will cause either head jump or track jump according to the relationship shown on FIG. 10. More particularly, on FIG. 10, the abscissa represents the fluctuation of the horizontal period of the reproduced video signals in units of $\beta/262.5$ that results from the counting by counter 51 of clock pulses from time base variation detector 49, while the ordinate represents the phase difference between the reproduced vertical synchronizing signal and the external reference vertical synchronizing signal. Of course, in the case illustrated by FIG. 10, one field of video signals includes 262.5 horizontal synchronizing signals and $\beta$, for purposes of H-alignment, is equal to 2.5 H. It will be appreciated that the values zero, $+\beta/262.5, +2\beta/262.5$ and $-\beta/262.5$, on the abscissa of FIG. 10, correspond to the still-motion reproducing mode, the normal-motion reproducing mode (in which the tape is driven in the forward direction at the same speed as during recording), the 2/1-fast motion reproducing mode, and the reverse-motion reproducing mode (in which the tape is driven at the same speed as during recording, but in the reverse direction), respectively. For reproducing operations of the VTR ranging from the still-motion reproducing mode to the normal-motion reproducing mode, that is, for values along the abscissa of FIG. 10 from zero to $+\beta/262.5$, the phase shift effected by phase shifter 76 is varied under the control of digital-to-analog converter 77 in accordance with the output of the time base variation detector 49 so as to cause comparator 74 to provide its low-level output as a track-jump signal to gate circuit 71 for values of the phase difference between the reproduced and external reference vertical synchronizing signals coming within the shaded region $Y_1$. By reason of the resulting track jump, the phase difference is returned to the unshaded region X for which phase comparator 74 provides a high-level output representing a head-jump signal to gate circuit 71. In FIG. 10, the dash-line defining shaded region $Y_1$ is based on the reasonable assumption that there is only a relatively small or narrow range of phase differences at each of the tape speeds, and that the phase differences in such range extend equally in the positive and negative directions from zero phase difference. Since time base errors due to the change of tape speed and head-rotational speed during a reproducing operation, and the arrangement of recorded signals in adjacent tracks for H-alignment, as well as due to time base errors introduced during recording, all contribute to the determination of whether or not a track jump is required, all of such time base errors can be easily corrected by means of the apparatus according to this invention.

In the above-described embodiment of this invention, the amount of phase shift effected by phase shifter 76 is determined by the analog output of converter 77 in correspondence to the output of time base variation detector 49. However, it should be noted that such amount of phase shift is proportional to the inclination of the bias voltage (as at $\theta_1$ and $\theta_2$ on FIG. 9A) applied to bi-morph leaf 15 in accordance with the deflection of the scanning path of head 16 from the direction of the record track $T_A$ and $T_B$ being scanned thereby. Accordingly, it will be appreciated that the amount of phase shift effected by phase shifter 76 may be controlled with a signal directly or indirectly derived from the speed and direction of movement of the tape.

For reproducing operations of the VTR between the normal-motion reproducing mode and the 2/1-fast-motion reproducing mode, phase shifter 76, or more properly the digital-to-analog converter 77 for controlling the same, is controlled so that the phase shifting amounts provided by shifter 76 to the external reference vertical synchronizing signal will cause comparator 74 to provide the low level or track jump signal to gate circuit 71 for values of the phase difference between the reproduced and external reference vertical synchronizing signals coming within the shaded region $Y_2$ on FIG. 10. In other words, the amount of phase shifting by shifted 76 causes the shifter external reference vertical synchronizing signal to lag behind the reproduced vertical synchronizing signal for phase differences in the region $Y_2$.

Beyond the 2/1-fast-motion reproducing mode, that is, for reproducing operations performed with the tape being advanced in the forward direction at speeds more than two times the tape speed for recording, the phase shifts effected by phase shifter 76 are controlled through converter 77 to result in track jump for phase differences between the reproduced and external reference vertical synchronizing signals coming within the shaded region $Y_3$ on FIG. 10.

When reproducing operations of the VTR are performed with the tape driven in the direction which is the reverse of that for recording and at speeds from zero to the normal tape speed for recording, that is, from the still-motion reproducing mode to the reverse-motion reproducing mode, the phase shifts provided by phase shifter 76 are controlled through converter 77 so as to cause the low-level output from comparator 74 for effecting the track jump in response to phase differences between thereproduced and external reference vertical synchronizing signals falling within the shaded area $Y_4$ on FIG. 10.

Suitable control signals for achieving the operating parameters of phase shifter 76 described above with reference to FIG. 10 can be provided to digital-to-analog converter 77 from a control signal source 79. The control signal source 79 may, for example, simply comprise a roller (not shown) engaged with the magnetic tape so as to be rotated in a direction and at a speed corresponding to the direction and speed, respectively, of movement of the tape, and a generator (not shown) or the like responsive to the rotation of such roller for providing the required control signals representing the speed and direction of movement of the tape for the various reproducing modes.

Figure 11:
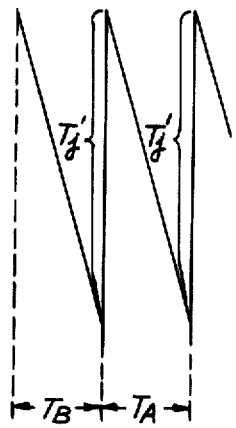
FIGS. 11, 12, and 13 are waveforms showing drive voltages applied to the bi-morph leaf supporting the magnetic head in FIG. 1 during a reproducing operation of the VTR in its normal-speed reverse mode, one-half slow-motion reverse mode, and fast-motion or fast-forward mode, respectively.
Figure 12:
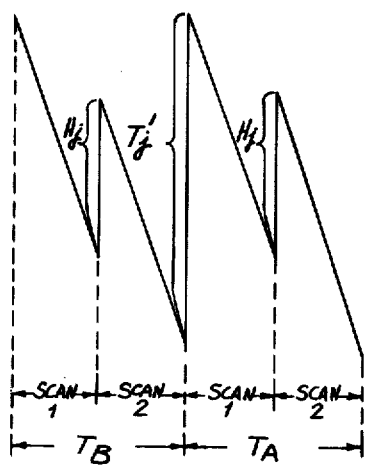

Referring now to FIG. 11, it will be seen that, for the reverse-motion reproducing mode in which the tape is driven at the same speed as for recording, but in the opposite direction, no head jump operation is required and, in the intervals between the scanning of tracks, $T_B$, $T_A$, etc., in that order, it is necessary to effect a track jump $T'_j$ equal to 2H, that is, a deflection of the bi-morph leaf 15 equal to two times the deflection for the head jump. In the case of the ½-slow-motion reverse reproducing mode, that is, a reproducing operation with the tape being driven at one half the recording tape speed and in the opposite direction to that for recording, a head jump $H_j$ and a track jump $T'_j$ are alternately required, as shown on FIG. 12, with the deflection for the track jump $T'_j$ again being equal to $2H_j$.

In order to effect the track jump $T'_j$, the embodiment of this invention shown on FIG. 1 further comprises a second phase comparator 80 which receives the reproduced vertical synchronizing signals from separator 73 and the external reference vertical synchronizing signals from source 75. Thus, comparator 80 is effective to detect the phase difference between each reproduced vertical synchronizing signal and an external reference vertical synchronizing signal prior to the phase shifting of the latter and, when the absolute value of the phase difference therebetween is greater than $\beta$ (2.5H), the output of comparator 80 attains a high level. Such high level output of phase comparator 80 is supplied to gate circuit 71 by way of a delay circuit 81 which has the same delay time as the delay circuit 78. Thus, when the phase difference between the reproduced and external reference vertical synchronizing signals is greater than $\beta$, that is, the phase difference is in the shaded region Z on FIG. 10, the resulting output of phase comparator 80 is applied through delay circuit 81 to gate circuit 71 as a track jump signal for obtaining the track jump $T'_j$ on FIG. 11 or 12.

As is shown on FIG. 1, the control signal source 79 also applies control signals to gate circuit 71 and selecting circuit 72 for indicating thereto the speed and direction of tape movement and correspondingly accommodating and functioning of circuits 71 and 72 to any selected reproducing mode of the VTR. Thus, in the case where the control signals applied from source 79 to circuits 71 and 72 indicate that either the normal reverse-motion reproducing mode (FIG. 11) or the ½-slow-motion reverse reproducing mode (FIG. 12) has been selected, the receipt by gate circuit 71 of the high level output from comparator 80 will cause the transmission to terminal 69 of time base variation detector 49 of twice the number of clock pulses as are provided for effecting a head jump $H_j$, and up-down counter 51 counts such relatively large number of clock pulses in a short time, or at least in the interval between successive scans of the tape by head 16, so as to change the drive signal $S_f$ for deflecting bi-morph leaf 15 to the extent necessary for achieving the track jump $T'_j$.

Normally, a phase difference in the Z region on FIG. 10 will not occur in any of the reproducing modes ranging from the still-motion reproducing mode to the 2/1-fast-motion reproducing mode. However, in certain special cases, for example, in the event of an abrupt change from driving the tape in the reverse direction to driving the tape in the normal or forward direction, there is the possibility that a phase difference may occur in the Z-region. Accordingly, it is preferable that the tracking control system remain effective to detect any phase difference in the Z-region, as by means of the comparator 80. At the start of a reverse-reproducing mode, there is the possibility that the phase difference between the reproduced and external reference vertical synchronizing signals will reach the shaded region $Y_4$ on FIG. 10. In such case, the head jump is inhibited, that is, the output from comparator 74 is inhibited or remains at a low level, and a track jump is effected in place thereof, in the same manner as has been described with reference to FIG. 8 for the case of the ½-slow-motion reproducing mode.

Figure 13:
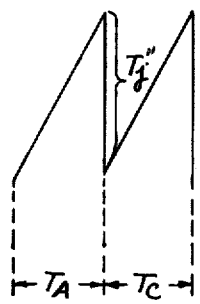

In a normal fast-motion reproducing mode, for example, in the 2/1-fast-motion reproducing mode, the inclination of the bias voltage applied to bi-morph leaf 15 during each scan is reversed, as shown on FIG. 13. By reason of the control signals applied to gate circuit 71 and selecting circuit 72 in correspondence to the 2/1-fast-motion reproducing mode, a high level output from comparator 74 in response to a phase difference in the X-region on FIG. 10 is effective to cause a head jump $H_j$ whereas, in response to a phase difference in the $Y_3$ region, the low-level output of comparator 74 causes inhibiting of the head jump, that is, the head-jump amount is made to be equal to zero, with the result that a track jump is effected. Finally, for a phase difference in the Z-region, as detected by comparator 80, a track jump of $2H_j$ is effected. However, since the direction of the correction is to be reversed for the fast-motion reproducing modes, the clock pulses for effecting either a head jump $H_j$ or a track jump equivalent to $2H_j$ are supplied through selecting circuit 72 to terminal 68 of time base variation detector 49, rather than to the terminal 69. Thus, the clock pulses are supplied through OR circuit 66 to be counted in the down direction by counter 51.

It will be appreciated that, in the above-described apparatus according to this invention, the phase difference between the reproduced vertical synchronizing signal and the external reference vertical synchronizing signal is detected, and on the basis of the detected phase difference being in the X-, Y- or Z-regions on FIG. 10, it is determined whether a head jump or a track jump is required at the completion of a scan and also the magnitude of the bias voltage that must be applied to bi-morph leaf 15 for effecting the necessary head jump or track jump. By reason of the foregoing, the recorded video signals can be reproduced in a stable manner in any of the various possible reproducing modes.

In the embodiment of the invention described above with reference to FIGS. 1–13, whether to effect a head jump or a track jump has been determined with reference to the detected phase differences between the reproduced vertical synchronizing signals included in the reproduced video signals and corresponding external reference vertical synchronizing signals. However, the present invention is not limited to the use of the vertical synchronizing signals for that purpose. In other words, any other positional signal may be recorded at a predetermined position along each of the record tracks so that, during reproducing operation, such positional signal may also be reproduced and have its time base error detected, for example, with reference to an external reference signal comparable with the positional signal, so as to similarly provide a basis for determining which of the head jump and track jump is to be effected. For example, the waveform of the N-th horizontal synchronizing signal to be recorded in the central position of each record track may be deformed in the manner illustrated on FIG. 14. By reason of such deformation of the N-th horizontal synchronizing signal recorded in each record track, the same may be detected when reproducing the recorded video signals to permit determination of the phase difference between the N-th horizontal synchronizing signal and a corresponding external reference synchronizing signal. The external horizontal synchronizing signal may be simply obtained by counting horizontal synchronizing signals from an external or reference source and phase comparing the N-th horizontal synchronizing signal from such external source with the reproduced horizontal synchronizing signal having the deformed waveform.

Figure 15:
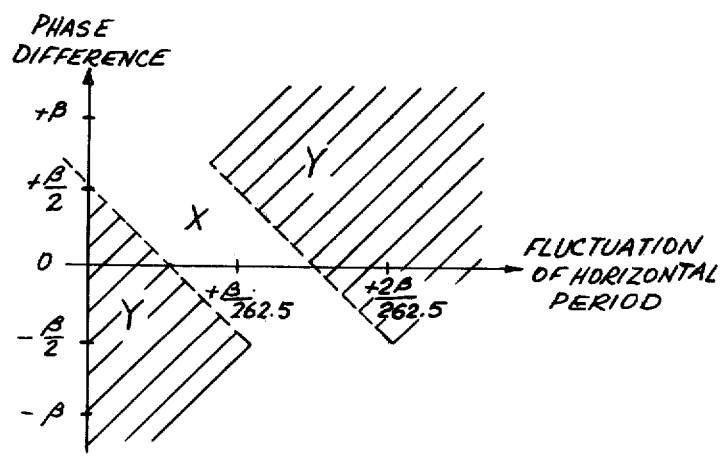
FIG. 15 is a view similar to that of FIG. 10, but illustrating operating parameters of the phase shifter when modified horizontal synchronizing signals, as shown on FIG. 14, are recorded at central positions of the respective record tracks for use in detecting time base errors.

Although the reproduced deformed horizontal synchronizing signal may be phase-compared with the N-th external reference horizontal synchronizing signal for determining substantially in the previously described manner whether a head jump or a track jump is to be effected, the conditions therefor are somewhat different, as shown on FIG. 15. More particularly, FIG. 15 shows the X- and Y-regions in which head jumps and track jumps are respectively effected for the reproducing modes ranging from the still-motion reproducing mode to the 2/1-fast-motion reproducing mode. The operations for phase differences in the X- and Y-regions of FIG. 15 are generally the same as those described with reference to FIG. 10. However, since a head jump or a track jump is to be effected during a time when head 16 does not contact the tape, the delay times of delay circuits 78 and 81 have to be increased when using the deformed horizontal synchronizing signals recorded at middle portions of the record tracks as the positional signals in place of the vertical synchronizing signal indicated at $V_A$, $V_B$ and $V_C$ on FIG. 5.

The modification described above with reference to FIGS. 14 and 15 can be conveniently employed in a VTR of the type in which two heads are disposed relatively near to each other so as to be capable of concurrently scanning the same record track for a relatively long period. In such a case, one of the two magnetic heads is used for detecting the deformed horizontal synchronizing signal, while the other of the two heads undergoes either a head jump or a track jump in response to the detected phase of the deformed horizontal synchronizing signal.

In the above description of embodiments of the invention, the terms "track jump" and "head jump" have been employed to describe the relation of the head to record tracks on the magnetic tape, however, it should be noted that, in effecting a "track jump", the head may be either moved through a predetermined distance or restrained from such movement in dependence on the selected reproducing mode.

In the apparatus according to this invention, the source 75 of the external reference synchronizing signals may be either a pulse generator which generates a pulse signal whenever the rotary head 16 reaches a predetermined rotational position, or the source 75 may be a suitable frequency generator which is controlled in accordance with the rotational speed of rotary head 16.

Although the invention is illustrated on FIG. 1 as being embodied in a VTR with a single magnetic head 16, it will be appreciated that the invention may be similarly applied to VTRs of the type in which two or more rotary magnetic heads are employed.

It will be appreciated that, in a VTR embodying this invention, each magnetic head may have its air gap extending in a direction normal to the lengthwise direction of the record track, or each magnetic head may be of the azimuth-gap type in which the direction of the air gap is inclined in respect to the lengthwise direction of the record track.

Although a bi-morph leaf 15 is included in the illustrated embodiment of the invention for deflecting the respective magnetic head 16, any other electro-mechanical or piezo-electric means or element can be used in place of the bi-morph leaf as a head deflecting means. It will be appreciated that the deflecting direction of the bi-morph leaf or other head deflecting means does not need to be precisely normal or perpendicular to the lengthwise direction of the record track so long as deflection of the bi-morph leaf or other head deflection means is effective to displace or move the respective head transversely in respect to the record track. Of course, in all embodiments of the invention, the deflecting direction of the bi-morph leaf or other head deflecting means has to be selected relative to the direction of the air gap of the respective head so as to provide for sensing the time base variation, as described above with reference to FIG. 4.

Figure 14:
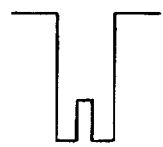
FIG. 14 is a waveform diagram showing a modified or distorted horizontal synchronizing signal which may be recorded at a predetermined position in each of the record tracks on the magnetic tape, for example, at a central or mid-position in the respective record track, and which may be reproduced as a positional signal for detecting time base errors in the reproduced signals.

Although the previously described embodiments of the invention detect the phase of the reproduced vertical synchronizing signal recorded in each track, as shown on FIG. 5, or the phase of the distorted or deformed horizontal synchronizing signal shown on FIG. 14, and which is recorded in the middle portion of each track, for determining when a track jump is to be effected, accumulation of time base errors detected by up-down counter 51 may be used instead of the detected phase for determining when a track jump is required.

In any event, it will be appreciated that in an apparatus according to this invention, the head can be made to scan correctly along a record track substantially without regard to the speed or direction of advancement of the tape, and further that such control of the scanning by the head is effected while reducing the time base variation to a minimum.

Having described illustrative embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for reproducing information signals recorded in successive parallel tracks on a record medium, with each of said tracks further containing a positional signal at a predetermined position therealong, comprising:
transducer means movable along each said track for reproducing the information and positional signals recorded therein; transducer deflecting means mounting said transducer means and being operative in response to the reception of an electrical drive signal for deflecting said transducer means in a direction which is transverse in respect to the direction along each of said tracks; means separating said positional signals from the signals reproduced by said transducer means; means receiving the separated positional signals for detecting a time base error of said positional signal reproduced from each of said tracks; and control circuit means for providing said electrical drive signal and including means for varying the latter in accordance with the detected time base error so as to control the deflection of said transducer means in said transverse direction at least in accordance with the detected time base error.

2. The apparatus according to claim 1; in which said record medium is a magnetic tape having said tracks extending obliquely thereon, said tape extends helically about at least a portion of the periphery of a guide drum and is adapted to be longitudinally advanced, at least a portion of said guide drum is rotatable, and said transducer means includes a magnetic head mounted by means of said transducer deflecting means on said rotatable portion of the guide drum so as to rotate with the latter and thereby scan along a selected one of the tracks positioned in proximity thereto by advancement of the tape.

3. The apparatus according to claim 2; further comprising deflection signal generating means for generating a deflection signal in correspondence to the deflection of said transducer means in said transverse direction from a rest position; and in which said control circuit means further includes oscillating means for providing a dither oscillation signal which, on application to said transducer deflection means, causes said transducer means to oscillate in said transverse direction about a null position, envelope detecting means for detecting the envelope of the output of said transducer means as the latter moves along a track and oscillates in said transverse direction, means for synchronously demodulating the detected envelope from said envelope detecting means by means of said deflection signal so as to obtain a tracking error signal representative of the deviation of said null position of the transducer means from the center of the track considered in said transverse direction, and means for adding said tracking error signal and said dither oscillation signal in said electrical drive signal for said transducer deflecting means.

4. The apparatus according to claim 3; in which said means for synchronously demodulating said detected envelope from said envelope detecting means includes multiplier means having inputs receiving said detected envelope from the envelope detecting means and said deflection signal, respectively.

5. The apparatus according to claim 4; in which said multiplier means is constituted by a balanced modulator.

6. The apparatus according to claim 3; in which said control circuit means further includes first band pass filter means through which said detected envelope from the envelope detecting means is applied to said means for synchronously demodulating the same, and second band pass filter means through which said deflection signal is applied to said means for synchronously demodulating said detected envelope; and each of said first and second band pass filter means has a pass band with a lower cut-off frequency which is a fraction of the frequency of said dither oscillation signal and an upper cut-off frequency which is less than two times said frequency of the dither oscillation signal.

7. The apparatus according to claim 6; in which said control circuit means further includes band elimination filter means through which said tracking error signal is applied to said means for adding the same and said dither oscillation signal in said electric drive signal, and said band elimination filter means is operative to eliminate a predetermined band of frequencies centered about two times the frequency of said dither oscillation signal.

8. The apparatus according to claim 3; in which said transducer deflecting means is constituted by a bimorph leaf which is cantilevered at one end and has said transducer means secured to the other end of said leaf, and said electrical drive signal is applied to said bimorph leaf for flexing the same and thereby causing the deflection in said transverse direction.

9. The apparatus according to claim 8; in which said deflection signal generating means includes a strain gauge secured on said bi-morph leaf so as to be stressed in accordance with the flexing of said leaf, and a circuit for providing said deflection signal in accordance with the stressing of the strain gauge.

10. The apparatus according to claim 1; in which said means for detecting a time base error includes a source of external reference signals comparable with said positional signals, and phase comparator means for comparing the separated positional signals with said external reference signals and providing a corresponding detected time base error signal to said means for varying the electrical drive signal.

11. The apparatus according to claim 10; in which said record medium is a magnetic tape having said tracks extending obliquely thereon and adapted to be longitudinally advanced, said transducer means includes a magnetic head mounted by means of said transducer deflecting means on a support which is movable for causing said head to repeatedly scan across said tape in a direction generally along said tracks, and delay means are provided for transmitting said detected time base error signal to said means for varying the electrical drive signal so that the latter is varied in the intervals between successive scans by said head.

12. The apparatus according to claim 10; in which said information signals are video signals which include vertical synchronizing signals, and said video signals are recorded in said tracks so that a vertical synchronizing signal is recorded at said predetermined position along each of said tracks to constitute said positional signal thereof.

13. The apparatus according to claim 10; in which said information signals are video signals comprised of field and line intervals with each line interval including a horizontal synchronizing signal, and the horizontal synchronizing signal of one line interval of each field has a distinctive waveform; and in which said video signals are recorded in said tracks so that a horizontal synchronizing signal with said distinctive waveform is recorded at said predetermined position along each of said tracks to constitute said positional signal thereof.

14. The apparatus according to claim 10; further comprising means for detecting a time base variation of the signals reproduced by said transducer means; and in which said control circuit means further includes means for varying said electrical drive signal in accordance with the detected time base variation.

15. The apparatus according to claim 14; further comprising phase-shifting means through which said external reference signals are applied to said comparator means, and means controlling said phase-shifting means in accordance with said detected time base variation.

16. The apparatus according to claim 14; in which said means for detecting the time base variation includes a source of clock pulses, gate means operative during each predetermined interval of said information signals to pass a number of said clock pulses corresponding to the extent to which the actual duration of the respective predetermined interval varies in respect to a standard duration thereof, and first and second output means selectively operative to deliver said number of clock pulses in correspondence to said actual duration being greater and less than, respectively, said standard duration.

17. The apparatus according to claim 16; in which said means for varying the electrical drive signal in accordance with the detected time base variation includes counting means connected with said first and second output means for counting down and up, respectively, said clock pulses delivered at said first and second output means, and digital-to-analog converting means for converting the count of said counting means to an analog voltage included in said electrical drive signal.

18. The apparatus according to claim 17; further comprising phase-shifting means through which said external reference signals are applied to said comparator means, second digital-to-analog converting means receiving the clock pulses from said first and second output means and providing a corresponding control signal for said phase-shifting means.

19. The apparatus according to claim 17; in which said means for varying the electrical drive signal in accordance with the detected time base error includes additional gate means operable by said detected time base error signals to pass predetermined numbers of said clock pulses from said source of the latter, and selecting means for selectively applying said clock pulses from said additional gate means to said first and second output means for counting down and up, respectively, by said counting means.

20. The apparatus according to claim 19; in which said phase comparator means includes first and second comparators comparing the separated positional signals with the external reference signals and respectively providing first and second detected time base error signals for opening said additional gate means to the passage of said clock pulses therethrough in response to first and second phase relations between said separated positional signals and said external reference signals.

21. The apparatus according to claim 20; in which said first and second detected time base error signals are effective to open said additional gate means for different respective durations so that said additional gate means passes corresponding different numbers of said clock pulses when opened by said first and second detected time base error signals.

22. The apparatus according to claim 21; in which said record medium is a magnetic tape having said tracks extending obliquely thereon and adapted to be longitudinally advanced at various speeds and in forward and reverse directions, and said transducer means includes a magnetic head mounted by means of said transducer deflecting means on a support which is movable for causing said head to repeatedly scan across said tape in a direction generally along said tracks; and said means for varying the electrical drive signal in accordance with the detected time base error further includes selecting control means operable in accordance with the selected speed and direction of advancement of said tape for correspondingly determining the one of said output means to which said selecting means applies the clock pulses from said additional gate means and determining operating parameters of said first comparator and said additional gate means.

23. The apparatus according to claim 14; in which said information signals are video signals comprised of field and line intervals and containing horizontal synchronizing signals between which the durations of said line intervals are defined; and in which said means for detecting the time base variation includes a source of clock pulses, gate signal forming means responsive to the horizontal synchronizing signals in the reproducing video signals to provide a first gating signals which is alternately at first and second levels for durations each equal to a whole multiple of the actual time intervals between successive horizontal synchronizing signals, first gate means made operative by said first level of the gating signal to pass clock pulses from said source, counting means operative to count said clock pulses from said first gate means and providing an output which is changed-over to a first level from a second level only while counting a number of clock pulses occurring in said whole multiple of the standard time interval between horizontal synchronizing signals, second gate means connected with said source of clock pulses, exclusive-OR circuit means receiving said first gating signal and said output of the counting means to provide a second gating signal for opening said second gate means when only one of said first gating signal and said output of the counting means is at said second level thereof, and first and second output means selectively operative to deliver clock pulses passing through said second gate means when said actual intervals are greater and less than, respectively, said standard time interval.

24. The apparatus according to claim 23; in which said means for varying the electrical drive signal in accordance with the detected time base variation includes additional counting means connected with said first and second output means for counting down and up, respectively, the clock pulses delivered at said first and second output means, and digital-to-analog converting means for converting the count of said additional counting means to an analog voltage included in said electrical drive signal.

25. The apparatus according to claim 24; in which said first and second output means include first and second AND circuits, respectively, each having one input receiving said clock pulses from said second gate means and another input, flip-flop means controllable by said first gating signal and said output of the first mentioned counting means to provide an output directly to said other input of one of said AND circuits, and inverting means through which said output of the flip-flop means is applied to said other input of the other of said AND circuits.

26. The apparatus according to claim 25; in which said first and second output means further include first and second OR circuits through which said first and second AND circuits are respectively connected with said additional counting means; and in which said means for varying the electrical drive signal in accordance with the detected time base error includes third gate means operable by said detected time base error signals to pass predetermined numbers of said clock pulses from said source of the latter, and selecting means for selectively applying said clock pulses from said third gate means through said first and second OR circuits for counting down and up, respectively, by said additional counting means.

27. The apparatus according to claim 26; in which said phase comparator means includes first and second comparators comparing the separated positional signals with the external reference signals and respectively providing first and second detected time base error signals for opening said third gate means to the passage of said clock pulses therethrough in response to first and second phase relations between said separated positional signals and said external reference signals.

28. The apparatus according to claim 27; in which said first and second detected time base error signals are effective to open said third gate means for different respective durations so that said third gate means passes corresponding different numbers of said clock pulses when opened by said first and second detected time base error signals.

29. The apparatus according to claim 28; in which said record medium is a magnetic tape having said tracks extending obliquely thereon and adapted to be longitudinally advanced at various speeds and in forward and reverse directions, and said transducer means includes a magnetic head mounted by means of said transducer deflecting means on a support which is movable for causing said head to repeatedly scan across said tape in a direction generally along said tracks; and said means for varying the electrical drive signal in accordance with the detected time base error further includes selecting control means operable in accordance with the selected speed and direction of advancement of said tape for correspondingly determining the one of said OR circuits to which said selecting means applies the clock pulses from said third gate means and determining operating parameters of said first comparator and said third gate means.

30. The apparatus according to claim 14; further comprising deflection signal generating means for generating a deflection signal in correspondence to the deflection of said transducer means in said transverse direction from a rest position, oscillating means for providing a dither oscillation signal which, on application to said transducer deflection means, causes said transducer means to oscillate in said transverse direction about a null position, envelope detecting means for detecting the envelope of the output of said transducer means as the latter moves along a track and oscillates in said transverse direction, means for synchronously demodulating the detected envelope from said envelope detecting means by means of said deflection signal so as to obtain a tracking error signal representative of the deviation of said null position of the transducer means from the center of the track considered in said transverse direction, and means for adding said tracking error signal and said dither oscillation signal in said electrical drive signal for said transducer deflecting means.

31. An apparatus for reproducing information signals recorded in successive parallel tracks on a record medium, with each of said tracks further containing a positional signal at a predetermined position therealong, comprising:
transducer means movable along each said track for reproducing the information and positional signals recorded therein; deflecting means for deflecting said transducer means in a direction which is transverse in respect to the direction along each of said tracks; means for supplying a drive signal to said deflecting means for moving said transducer means so as to accurately follow a desired one of said tracks; means separating said positional signals from the signals reproduced by said transducer means; means receiving the separated positional signals for detecting a time base error of said positional signal reproduced from each of said tracks; means for modifying said drive signal supplied to said deflecting means with a control signal for controlling the position of said transducer means in said direction of the deflecting thereof so as to start the scanning of a next desired track from the beginning thereof; and means for controlling said means for modifying in accordance with said detected time base error.

32. The apparatus according to claim 31; in which said means for detecting a time base error includes phase comparator means for comparing the separated positional signals with external reference signals.

33. The apparatus according to claim 32; in which said means for detecting a time base error further includes phase shifting means for shifting a relative phase between said separated positional signals and said external reference signals as applied to said phase comparator means in accordance with the speed and direction of movement of said record medium.

34. The apparatus according to claim 31; in which said record medium is a magnetic tape having said tracks extending obliquely thereon, said tape extends helically about at least a portion of the periphery of a guide drum and is adapted to be longitudinally advanced, at least a portion of said guide drum is rotatable, and said transducer means includes a magnetic head mounted by means of said deflecting means on said rotatable portion of the guide drum so as to rotate with the latter and thereby scan along a selected one of the tracks positioned in proximity thereto by advancement of the tape.

35. The apparatus according to claim 34; further comprising deflection signal generating means for generating a deflection signal in correspondence to the deflection of said transducer means in said transverse direction from a rest position; and in which said means for supplying a drive signal further includes oscillating means for providing a dither oscillation signal which, on application to said deflection means, causes said transducer means to oscillate in said transverse direction about a null position, envelope detecting means for detecting the envelope of the output of said transducer means as the latter moves along a track and oscillates in said transverse direction, means for synchronously demodulating the detected envelope from said envelope detecting means by means of said deflection signal so as to obtain a tracking error signal representative of the deviation of said null position of the transducer means from the center of the track considered in said transverse direction, and means for adding said tracking error signal and said dither oscillation signal in said drive signal for said deflecting means.

36. The apparatus according to claim 35; in which said means for synchronously demodulating said detected envelope from said envelope detecting means includes multiplier means having inputs receiving said detected envelope from the envelope detecting means and said deflection signal, respectively.

37. The apparatus according to claim 36; in which said multiplier means is constituted by a balanced modulator.

38. The apparatus according to claim 35; in which said means for supplying a drive signal further includes first band pass filter means through which said detected envelope from the envelope detecting means is applied to said means for synchronously demodulating the same, and second band pass filter means through which said deflection signal is applied to said means for synchronously demodulating said detected envelope; and each of said first and second band pass filter means has a pass band with a lower cut-off frequency which is a fraction of the frequency of said dither oscillation signal and an upper cut-off frequency which is less than two times said frequency of the dither oscillation signal.

39. The apparatus according to claim 38; in which said means for supplying a drive signal further includes band elimination filter means through which said tracking error signal is applied to said means for adding the same and said dither oscillation signal in said drive signal, and said band elimination filter means is operative to eliminate a predetermined band of frequencies centered about two times the frequency of said dither oscillation signal.

40. The apparatus according to claim 35; in which said deflecting means is constituted by a bi-morph leaf which is cantilevered at one end and has said transducer means secured to the other end of said leaf, and said drive signal is applied to said bi-morph leaf for flexing the same and thereby causing the deflection in said transverse direction.

41. The apparatus according to claim 40; in which said deflection signal generating means includes a strain gauge secured on said bi-morph leaf so as to be stressed in accordance with the flexing of said leaf, and a circuit for providing said deflection signal in accordance with the stressing of the strain gauge.

42. The apparatus according to claim 31; in which said means for detecting a time base error includes a source of external reference signals comparable with said positional signals, and phase comparator means for comparing the separated positional signals with said external reference signals and providing a corresponding detected time base error signal to said means for supplying the drive signal.

43. The apparatus according to claim 42; in which said record medium is a magnetic tape having said tracks extending obliquely thereon and adapted to be longitudinally advanced, said transducer means includes a magnetic head mounted by means of said deflecting means on a support which is movable for causing said head to repeatedly scan across said tape in a direction generally along said tracks, and delay means are provided for transmitting said detected time base error signal to said means for supplying the drive signal so that the latter is varied in the intervals between successive scans by said head.

44. The apparatus according to claim 42; in which said information signals are video signals which include vertical synchronizing signals, and said video signals are recorded in said tracks so that a vertical synchronizing signal is recorded at said predetermined position along each of said tracks to constitute said positional signal thereof.

45. The apparatus according to claim 42; in which said information signals are video signals comprised of field and line intervals with each line interval including a horizontal synchronizing signal, and the horizontal synchronizing signal of one line interval of each field has a distinctive waveform; and in which said video signals are recorded in said tracks so that a horizontal synchronizing signal with said distinctive waveform is recorded at said predetermined position along each of said tracks to constitute said positional signal thereof.

46. The apparatus according to claim 42; further comprising means for detecting a time base variation of the signals reproduced by said transducer means; and in which said means for modifying said drive signal further includes means for varying said drive signal in accordance with the detected time base variation.

47. The apparatus according to claim 46; further comprising phase-shifting means through which said external reference signals are applied to said comparator means, and means controlling said phase-shifting means in accordance with said detected time base variation.

48. The apparatus according to claim 46; in which said means for detecting the time base variation includes a source of clock pulses, gate means operative during each predetermined interval of said information signals to pass a number of said clock pulses corresponding to the extent to which the actual duration of the respective predetermined interval varies in respect to a standard duration thereof, and first and second output means selectively operative to deliver said number of clock pulses in correspondence to said actual duration being greater and less than, respectively, said standard duration.

49. The apparatus according to claim 48; in which said means for varying the drive signal in accordance with the detected time base variation includes counting means connected with said first and second output means for counting down and up, respectively, said clock pulses delivered at said first and second output means, and digital-to-analog converting means for converting the count of said counting means to an analog voltage included in said drive signal.

50. The apparatus according to claim 49; further comprising phase-shifting means through which said external reference signals are applied to said comparator means, and second digital-to-analog converting means receiving the clock pulses from said first and second output means and providing a corresponding control signal for said phase-shifting means.

51. The apparatus according to claim 49; in which said means for varying the drive signal in accordance with the detected time base error includes additional gate means operable by said detected time base error signals to pass predetermined numbers of said clock pulses from said source of the latter, and selecting means for selectively applying said clock pulses from said additional gate means to said first and second output means for counting down and up, respectively, by said counting means.

52. The apparatus according to claim 51; in which said phase comparator means includes first and second comparators comparing the separated positional signals with the external reference signals and respectively providing first and second detected time base error signals for opening said additional gate means to the passage of said clock pulses therethrough in response to first and second phase relations between said separated positional signals and said external reference signals.

53. The apparatus according to claim 52; in which said first and second detected time base error signals are effective to open said additional gate means for different respective durations so that said additional gate means passes corresponding different numbers of said clock pulses when opened by said first and second detected time base error signals.

54. The apparatus according to claim 53; in which said record medium is a magnetic tape having said tracks extending obliquely thereon and adapted to be longitudinally advanced at various speeds and in forward and reverse directions, and said transducer means includes a magnetic head mounted by means of said deflecting means on a support which is movable for causing said head to repeatedly scan across said tape in a direction generally along said tracks; and said means for varying the drive signal in accordance with the detected time base error further includes selecting control means operable in accordance with the selected speed and direction of advancement of said tape for correspondingly determining the one of said output means to which said selecting means applies the clock pulses from said additional gate means and determining operating parameters of said first comparator and said additional gate means.

55. The apparatus according to claim 46; in which said information signals are video signals comprised of field and line intervals and containing horizontal synchronizing signals between which the durations of said line intervals are defined; and in which said means for detecting the time base variation includes a source of clock pulses, gate signal forming means responsive to the horizontal synchronizing signals in the reproduced video signals to provide a first gating signal which is alternately at first and second levels for durations each equal to a whole multiple of the actual time intervals between successive horizontal synchronizing signals, first gate means made operative by said first level of the gating signal to pass clock pulses from said source, counting means operative to count said clock pulses from said first gate means and providing an output which is changed-over to a first level from a second level only while counting a number of said clock pulses occurring in said whole multiple of the standard time interval between horizontal synchronizing signals, second gate means connected with said source of clock pulses, exclusive-OR circuit means receiving said first gating signal and said output of the counting means to provide a second gating signal for opening said second gate means when only one of said first gating signal and said output of the counting means is at said second level thereof, and first and second output means selectively operative to deliver clock pulses passing through said second gate means when said actual intervals are greater and less than, respectively, said standard time interval.

56. The apparatus according to claim 55; in which said means for varying the drive signal in accordance with the detected time base variation includes additional counting means connected with said first and second output means for counting down and up, respectively, the clock pulses delivered at said first and second output means, and digital-to-analog converting means for converting the count of said additional counting means to an analog voltage included in said drive signal.

57. The apparatus according to claim 56; in which said first and second output means include first and second AND circuits, respectively, each having one input receiving said clock pulses from said second gate means and another input, flip-flop means controllable by said first gating signal and said output of the first mentioned counting means to provide an output directly to said other input of one of said AND circuits, and inverting means through which said output of the flip-flop means is applied to said other input of the other of said AND circuits.

58. The apparatus according to claim 57; in which said first and second output means further include first and second OR circuits through which said first and second AND circuits are respectively connected with said additional counting means; and in which said means for varying the drive signal in accordance with the detected time base error includes third gate means operable by said detected time base error signals to pass predetermined numbers of said clock pulses from said source of the latter, and selecting means for selectively applying said clock pulses from said third gate means through said first and second OR circuits for counting down and up, respectively, by said additional counting means.

59. The apparatus according to claim 58; in which said phase comparator means includes first and second comparators comparing the separated positional signals with the external reference signals and respectively providing first and second detected time base error signals for opening said third gate means to the passage of said clock pulses therethrough in response to first and second phase relations between said separated positional signals and said external reference signals.

60. The apparatus according to claim 59; in which said first and second detected time base error signals are effective to open said third gate means for different respective durations so that said third gate means passes corresponding different numbers of said clock pulses when opened by said first and second detected time base error signals.

61. The apparatus according to claim 60; in which said record medium is a magnetic tape having said tracks extending obliquely thereon and adapted to be longitudinally advanced at various speeds and in forward and reverse directions, and said transducer means includes a magnetic head mounted by means of said deflecting means on a support which is movable for causing said head to repeatedly scan across said tape in a direction generally along said tracks; and said means for varying drive signal in accordance with the detected time base error further includes selecting control means operable in accordance with the selected speed and direction of advancement of said tape for correspondingly determining the one of said OR circuits to which said selecting means applies the clock pulses from said third gate means and determining operating parameters of said first comparator and said third gate means.

62. The apparatus according to claim 46; further comprising deflection signal generating means for generating a deflection signal in correspondence to the deflection of said transducer means in said transverse direction from a rest position, oscillating means for providing a dither oscillation signal which, on application to said deflection means, causes said transducer means to oscillate in said transverse direction about a null position, envelope detecting means for detecting the envelope of the output of said transducer means as the latter moves along a track and oscillates in said transverse direction, means for synchronously demodulating the detected envelope from said envelope detecting means by means of said deflection signal so as to obtain a tracking error signal representative of the deviation of said null position of the transducer means from the center of the track considered in said transverse direction, and means for adding said tracking error signal and said dither oscillation signal in said drive signal for said transducer deflecting means.

* * * * *